(12) United States Patent
Deaver, Sr. et al.

(10) Patent No.: US 7,804,280 B2
(45) Date of Patent: Sep. 28, 2010

(54) METHOD AND SYSTEM FOR PROVIDING POWER FACTOR CORRECTION IN A POWER DISTRIBUTION SYSTEM

(75) Inventors: Brian J. Deaver, Sr., Fallston, MD (US); William O. Radtke, Ellicott City, MD (US); William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 217 days.

(21) Appl. No.: 11/747,454

(22) Filed: May 11, 2007

(65) Prior Publication Data

US 2008/0106241 A1    May 8, 2008

Related U.S. Application Data

(63) Continuation-in-part of application No. 11/555,740, filed on Nov. 2, 2006.

(51) Int. Cl.
*G05F 1/70*    (2006.01)
*G08B 21/00*    (2006.01)

(52) U.S. Cl. .................... 323/210; 340/663

(58) Field of Classification Search ............... 323/207, 323/208, 209, 212, 218, 210; 307/11, 14, 307/31, 105; 340/310.11, 310.14, 658, 663; 700/286, 297, 298
See application file for complete search history.

(56) References Cited

U.S. PATENT DOCUMENTS

| | | | | |
|---|---|---|---|---|
| 3,313,984 | A * | 4/1967 | Hupp | 361/92 |
| 4,055,795 | A * | 10/1977 | Mathieu | 323/211 |
| 4,769,587 | A * | 9/1988 | Pettigrew | 323/209 |
| 4,931,701 | A * | 6/1990 | Carl | 315/240 |
| 5,541,498 | A * | 7/1996 | Beckwith | 323/211 |
| 5,670,864 | A * | 9/1997 | Marx et al. | 323/211 |
| 5,736,838 | A * | 4/1998 | Dove et al. | 323/211 |
| 6,147,475 | A | 11/2000 | Bridgeman | |
| 6,462,519 | B1 * | 10/2002 | McDaniel et al. | 323/211 |

(Continued)

OTHER PUBLICATIONS

"International Search Report", International Search Report PCT/US07/082761 Dated Jul. 1, 2008.

(Continued)

*Primary Examiner*—Gary L Laxton
(74) *Attorney, Agent, or Firm*—Mel Barnes; Capital Legal Group, LLC

(57) ABSTRACT

A device for providing power factor correction of a low voltage subnet that includes a low voltage feeder line that is connected to one or more low voltage power supply lines that supply power to one or more customer premises is provided. In one embodiment, the device includes a power factor measurement module configured to measure power parameters for determining a power factor of the power traversing the low voltage subnet; a power factor correction assembly configured to vary a capacitance connected to the low voltage feeder of the low voltage subnet; a controller in communication with the power factor measurement assembly and the power factor correction assembly. The controller may be configured to cause the power factor correction assembly to change the capacitance based on the determined power factor. The controller may form part of a power line communication device configured to provide communications to the one or more customer premises.

28 Claims, 9 Drawing Sheets

U.S. PATENT DOCUMENTS

| | | |
|---|---|---|
| 6,590,493 B1 | 7/2003 | Rasimas |
| 6,917,888 B2 | 7/2005 | Logvinov et al. |
| 7,069,117 B2 * | 6/2006 | Wilson et al. ............... 700/295 |
| 7,091,703 B2 | 8/2006 | Folts et al. |
| 7,095,597 B1 * | 8/2006 | Cousineau ................... 361/20 |
| 7,609,158 B2 * | 10/2009 | Banting et al. ......... 340/539.22 |
| 7,667,353 B2 * | 2/2010 | Coolidge et al. ............ 307/127 |
| 7,675,427 B2 * | 3/2010 | Deaver et al. ............... 340/661 |
| 2002/0101743 A1 | 8/2002 | Kallus et al. |
| 2002/0180408 A1 | 12/2002 | McDaniel et al. |
| 2003/0103303 A1 | 6/2003 | Barnes et al. |
| 2003/0160595 A1 | 8/2003 | Provanzana et al. |
| 2004/0164718 A1 | 8/2004 | McDaniel et al. |
| 2004/0260488 A1 | 12/2004 | Al-Hamrani |
| 2005/0194944 A1 * | 9/2005 | Folts et al. ................... 323/209 |
| 2006/0195229 A1 | 8/2006 | Bell et al. |
| 2006/0250117 A1 * | 11/2006 | Rayburn .................... 323/209 |
| 2007/0024264 A1 | 2/2007 | Lestician |
| 2007/0185665 A1 | 8/2007 | Roytelman |
| 2008/0106241 A1 | 5/2008 | Deaver et al. |

OTHER PUBLICATIONS

"Written Opinion", Written Opinion PCT/US2007/082761 Dated Jul. 1, 2008.

* cited by examiner

METHOD AND SYSTEM FOR PROVIDING POWER FACTOR CORRECTION IN A POWER DISTRIBUTION SYSTEM

CROSS REFERENCE TO RELATED APPLICATIONS

This application is a continuation-in-part of, and claims priority to, U.S. patent application Ser. No. 11/555,740 filed Nov. 2, 2006, which is incorporated herein by reference in its entirety.

FIELD OF THE INVENTION

The present invention generally relates to methods, systems, and apparatus for efficiently distributing power, and more particularly to methods, systems, and devices for providing power factor correction in a power distribution system.

BACKGROUND OF THE INVENTION

Power factor is a ratio of real power to apparent power. Real power measures the ability of a network load to perform work in a particular time, and is associated with power consumption by a resistive load. Apparent power is the product of voltage and current, and may be equal to or greater than the real power due to an impedance of a reactive load. In a purely resistive circuit, voltage and current waveforms are in step, changing polarity at the same instant in each cycle. In such a circuit the power factor is one. In a circuit having reactive loads, such as a circuit having capacitive or inductive loads, there may be a time difference (a phase delay) between current and voltage waveforms of the alternating current power. In particular, the capacitive and/or inductive loads alternately store and release energy and may alter the phase between current and voltage. In such a circuit the power factor may be less than one. Because the stored energy returns to its source and is not available to do work at the load, a circuit with a lower power factor will receive higher currents for a given quantity of received real power than a circuit with a higher power factor. Accordingly, power lines may carry more current than necessary to provide power to portions of a power distribution network having reactive loads. The additional current may result in additional real power losses caused by the losses of the power transmission lines in conducting the additional current and may require the generating facility to produce more power.

It is undesirable for a power distribution network to have portions with a power factor that is substantially far from unity. Production of such excess power is inefficient and is inconsistent with policies of conserving energy and preserving environmental resources. Further, in order to distribute the increased apparent power, the utility may need to build additional infrastructure for networks beyond the networks required for distribution of real power. Further, consumer utility meters typically measure only real power and consumers are charged for real power consumption. However, the costs of delivering power determine power rates. Thus, power utility rates may increase to reflect the utility company's cost of delivering the higher apparent power. Accordingly, it is desirable to measure and correct the power factor of a power distribution system to thereby enable the power distribution system to operate in a more efficient manner. These and other advantages may be provided by one or more embodiments of the other present invention.

SUMMARY OF THE INVENTION

The present invention provides a device for providing power factor correction of a low voltage subnet that includes a low voltage feeder line that is connected to one or more low voltage power supply lines that supply power to one or more customer premises. In one embodiment, the device includes a power factor measurement module configured to measure power parameters for determining a power factor of the power traversing the low voltage subnet; a power factor correction assembly configured to vary a capacitance connected to the low voltage feeder of the low voltage subnet; a controller in communication with the power factor measurement assembly and the power factor correction assembly. The controller may be configured to cause the power factor correction assembly to change the capacitance based on the determined power factor. The controller may form part of a power line communication device configured to provide communications to the one or more customer premises.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
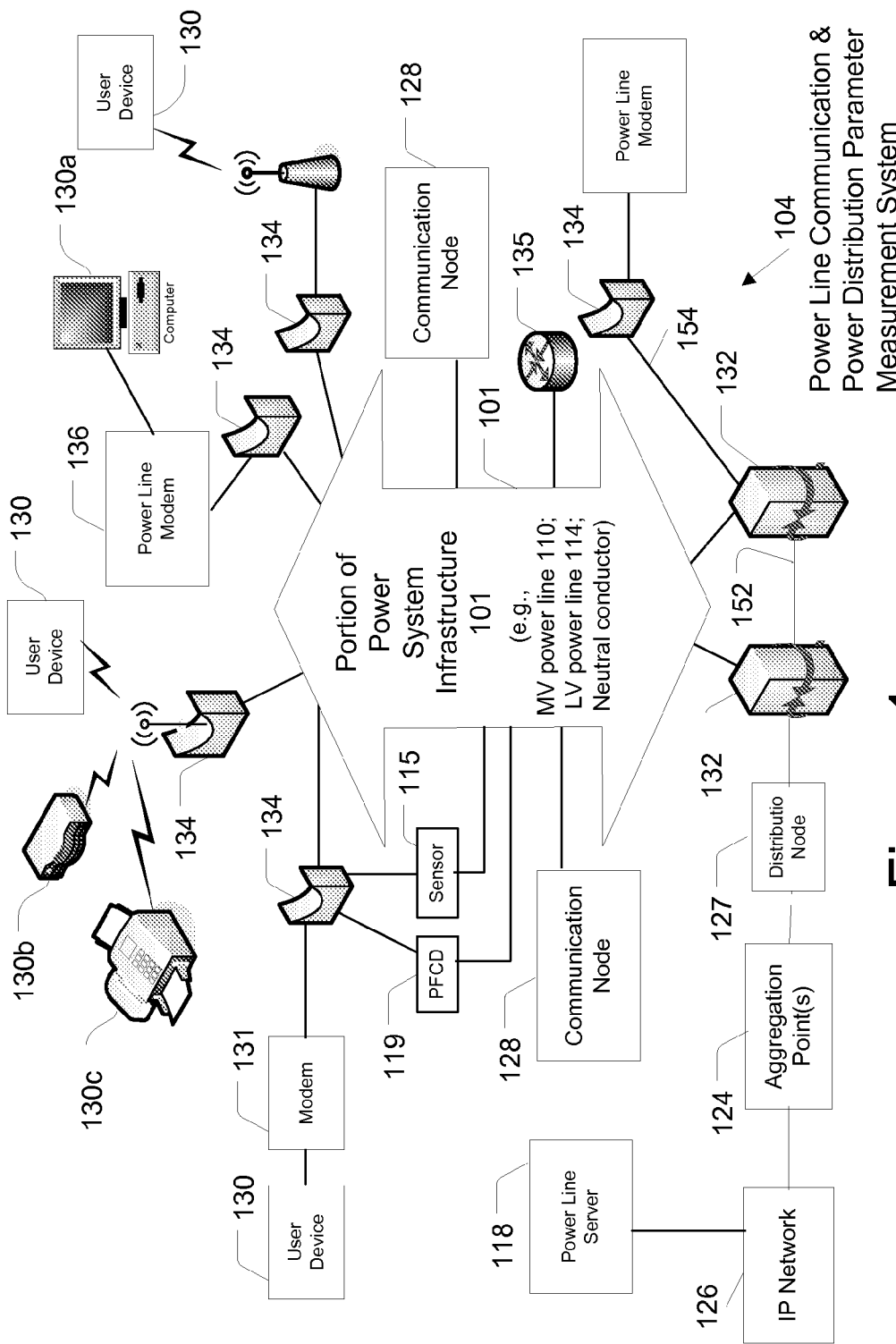
FIG. 1 is a block diagram of an example power line communication and power factor control system.

In the following description, for purposes of explanation and not limitation, specific details are set forth, such as particular networks, communication systems, computers, terminals, devices, components, techniques, data and network protocols, power line communication systems (PLCSs), software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, PLCSs, components, techniques, data and network protocols, software products and systems, operating systems, development interfaces, and hardware are omitted so as not to obscure the description of the present invention.

Communication and Measurement System

A power line communication and power distribution parameter measurement system may be implemented to gather power distribution parameters from multiple points along a power distribution network and transmit the gathered data to a utility or other processing center. For example, sensing devices may be positioned along overhead and underground medium voltage power lines, and along network medium and low voltage power lines. Power line communication devices may be positioned throughout the power distribution network to receive measurements from the sensing devices. Accordingly, the power line utility may monitor power line current and voltage at given locations to measure power factor for corresponding portions of the distribution network.

For example, the power factor may be measured at a distribution transformer to determine the power factor for a low voltage power line sub-network served by such transformer. In another example, the power factor may be measured at a utility meter (or at or near the entry of the power supply lines to the structure) to measure power factor for the load at a given customer's premises (e.g., on each of the energized conductors). The power factor may be determined from measurements by a power line parameter sensing device, the power factor data stored at a power line communication device, and subsequently transmitted to a processing center. A power factor correction may be made from the processing center or automatically as a result of processing by the communication device. A power factor correction device, according to an embodiment of this invention, may receive the correction message or signal. In particular, the power factor correction device may be connected to a low voltage power line and respond to a command from the power line communication device to maintain the power factor at a desired value, (e.g., approximately 1.0) for a portion of the power distribution network. The power line communication devices, power line parameter sensing devices and power factor correction devices are described in more detail below.

In addition to deriving power factor correction, power line parameter data may monitored for use in many additional ways. For example, the power line utility may monitor power line current and voltage at many locations to improve operations and maintenance, and to assist in network planning. Load balancing may be performed such as by re-configuring switches to more efficiently distribute loads. Capacitor banks may be installed to optimize network performance. Infrastructure build-outs can be planned based on usage patterns in specifics portions of a network.

The power line communication and power distribution parameter system also may provide user services, such as high speed broadband internet access, mobile telephone communications, broadband (e.g., wireless) communications, streaming video and audio services, and other communication services to homes, buildings and other structures, and to each room, office, apartment, or other unit or sub-unit of multi-unit structures. Communication services also may be provided to mobile and stationary devices in outdoor areas such as customer premises yards, parks, stadiums, and also to public and semi-public indoor areas such as subway trains, subway stations, train stations, airports, restaurants, public and private automobiles, bodies of water (e.g., rivers, bays, inlets, etc.), building lobbies, elevators, etc.

FIG. 1 shows components of a power line communication system that may be used to provide a power factor correction system. The system 104 may include a plurality of communication nodes 128 which form communication links using power lines 110, 114 and other communication media. Various user devices 130 and power line communication devices 138, 139, 135 may transmit and receive data over the links to communicate via an IP network 126 (e.g., the Internet). Among the data may be measurement and/or processed data of power distribution parameters. Other data communicated may include control data and user data. For example, commands responsive to the measured power line distribution parameters may be communicated. One type of communication node 128 may be a backhaul node 132. Another type of communication node 128 may be an access node 134. Another type of communication node 128 may be a repeater node 135. Some embodiments of a given node 128 may serve as a backhaul node 132, access node 134, and/or repeater node 135.

A communication link is formed between two communication nodes 128 over a communication medium. Some links may be formed over MV power lines 110. Some links may be formed over LV power lines 114. Other links may be gigabit-Ethernet links 152, 154 formed, for example, using a fiber optic cable. Thus, some links may be formed using a portion 101 of the power system infrastructure, while other links may be formed over another communication media, (e.g., a coaxial cable, a T-1 line, a fiber optic cable, wirelessly (e.g., wireless pager system, mobile telephone network, IEEE 802.11a/b/g, 802.16, 1G, 2G, 3G, or satellite such as Wild-Blue®)). The links formed by wired or wireless media may occur at any point along a communication path between a backhaul node 132 and a user device 130.

Each communication node 128 may be formed by one or more communication devices. Communication nodes which communicate over a power line medium include a power line communication device. Exemplary power line communication devices include a backhaul device 138 (see FIGS. 8 and 9), an access device 139 (also referred to as a power line bridge) (see FIGS. 10 and 11), a repeater (see FIG. 1), and a power line modem 136 (see FIG. 1). Communication nodes which communicate wirelessly may include a mobile telephone cell site or a wireless access point having at least a wireless transceiver. Communication nodes which communicate over a coaxial cable may include a cable modem. Communication nodes which communicate over a twisted pair wire may include a DSL modem or other modem. A given communication node typically will communicate bi-directionally (either full duplex or half duplex), which may be over the same or different types of communication media. Accordingly, a communication node 128 may include one, two or more communication devices.

A power line parameter sensor device 115 may be located in the vicinity of, and communicatively coupled to, a power line communication device 138, 139, 135. The power line parameter sensor device 115 measures (hereinafter to include measure or detect) a power line parameter of a power line 110, 114, such as current, voltage, power factor, detection of a power outage, detection of water in a pad mount transformer enclosure, detection of an open pad mount transformer enclosure, detection of a street light failure, power delivered to a transformer data (i.e., wherein the sensor device is coupled the lead that connects the transformer to the MV power line), power factor data (e.g., the phase angle between the voltage and current of a power line), power delivered to a downstream branch data, data of the harmonic components of a power signal, load transients data, and/or load distribution data. One skilled in the art will appreciate that other types of utility parameter data also may be gathered. The measured parameter may be sampled by the power line communication device and communicated to a power line server 118, or other power line distribution management system or power line communication management system.

The power factor correction device 119 may be connected to an LV power line 114 to adjust the power factor thereof. For example, the power factor correction device 119 may include one or more capacitors. The power factor correction device 119 may be communicatively coupled to a nearby power line communication device 138, 139, 135, and respond to a signal or control message to connect (or disconnect) one or more capacitors to the power line 114 to alter the power factor.

A backhaul node 132 may serve as an interface between a power line portion (e.g., an MV power line 110) of the network 104 and a distribution node 127, which may be connected to an aggregation point 124 that provides a connection to an IP network 126 (e.g., the Internet). The communication network 104 may include a plurality of backhaul nodes 132. Upstream communications from user premises may be communicated to an access node 134, to a backhaul node 132, and then transmitted to an aggregation point 124 which is linked to the IP network 126. The backhaul node 132 may be coupled to the aggregation point 124 directly or indirectly (i.e., via one or more intermediate nodes). The backhaul node 132 may communicate with its upstream device via any of several alternative communication media, such as a fiber optic (digital or analog (e.g., Wave Division Multiplexed), coaxial cable, WiMAX, IEEE, 802.11, wireless pager system, mobile telephone network, twisted pair and/or another wired or wireless media. Downstream communications from the IP network 126 typically are communicated through the aggregation point 124 to the backhaul node 132. The aggregation point 124 typically includes an Internet Protocol (IP) network data packet router and is connected to an IP network backbone, thereby providing access to an IP network 126 (i.e., can be connected to or form part of a point of presence or POP). Any available mechanism may be used to link the aggregation point 124 to the POP or other device (e.g., fiber optic conductors, T-carrier, Synchronous Optical Network (SONET), and wireless techniques).

An access node 134 may serve one or more user devices 130 or other network destinations. Upstream data may be sent, for example, from a user device 130 to an access node 134. Other data, such as power line parameter data (e.g., current measured by a power line current sensor; power factor measured by a current sensor and a voltage sensor) may be received by an access node's power line communication device 139 (see FIGS. 10-11). The data enters the network 104 along a communication medium coupled to an access node 134. The data is routed through the network 104 to a backhaul node 132, (or a local destination, such as another user device 130). Downstream data is sent through the network 104 to a user device 130. Exemplary user devices 130 include a computer 130a, LAN, a WLAN, router 130b, Voice-over IP endpoint, game system, personal digital assistant (PDA), mobile telephone, digital cable box, power meter, gas meter, water meter, security system, alarm system (e.g., fire, smoke, carbon dioxide, security/burglar, etc.), stereo system, television, fax machine 130c, HomePlug residential network, or other device having a data interface. A user device 130 may include or be coupled to a modem to communicate with a given access node 134. Exemplary modems include a power line modem 136, a wireless modem 131, a cable modem, a DSL modem or other suitable transceiver device.

A repeater node 135 may receive and re-transmit data (i.e., repeat), for example, to extend the communications range of other communication elements. As a communication traverses the communication network 104, backhaul nodes 132 and access nodes 134 also may serve as repeater nodes 135, (e.g., for other access nodes and other backhaul nodes 132). Repeaters may also be stand-alone devices without additional functionality. Repeaters 135 may be coupled to and repeat data on MV power lines or LV power lines (and, for the latter, be coupled to the internal or external LV power lines).

Communication nodes which access a link over a wireless medium may include a wireless access point having at least a wireless transceiver or a mobile telephone cell site (e.g., a micro or pico cell site). Communication nodes which access a link over a coaxial cable may include a cable modem. Communication nodes which access a link over a T-1 wire may include a DSL modem. Nodes that communicate may also include a wireless pager system transceiver or a mobile telephone network transceiver. According to an embodiment of a power line communication device, a backhaul device 138 or access device 139 or repeater may establish links over MV power lines 110, LV power lines 114, wired media, and wireless media. Accordingly, a given communication node may communicate along two or more directions establishing multiple communication links, which may be formed along the same or different types of communication media.

Power Distribution Parameter Sensor Device:

In various embodiments, the power line distribution parameter sensor device 115 (see FIG. 1) may measure or detect a parameter of a power line 110, 114, such as current, voltage, power usage data, detection of a power outage, detection of water in a pad mount transformer enclosure, detection of an open pad mount transformer enclosure, detection of a street light failure, power delivered to a transformer data (i.e., wherein the sensor device is coupled the lead that connects the transformer to the MV power line), power factor data (e.g., the phase angle between the voltage and current of a power line, which may be determined by processing data from multiple sensors (i.e., current and voltage), power delivered to a downstream branch data, data of the harmonic components of a power signal, load transients data, load distribution data, and/or other characteristics. One skilled in the art will appreciate that other types of parameter data also may be gathered.

In addition, one sensor device 115 may be configured to provide data of more than one parameter. For example, a single sensor device may be configured to provide data of the voltage and current carried by the power line (and therefore have multiple sensors). One or more sensor devices 115 may be installed on a given power line 110 and/or 114 and be coupled to a corresponding power line communication device 138,139,135. For example, a power line current sensor device may be installed at power lines 110 and 114 alone or with another power line parameter sensor device (e.g., a power line voltage sensor device). In addition, the data provided by the sensor device 115 may be used to determine additional parameters (either by the sensor device, the power line communication device, or a remote computer). For example, a sensor device 115 may be configured to measure the instantaneous (e.g., multiple samples of) voltage and current, which information is provided to the power line communication device 138, 139, 135 for processing (e.g., to determine the power factor). With adequate voltage and current sampling, the device 138, 139, or 135 may compute the power factor of the power line as is known in the art. Further, other power line parameters may be sensed using an appropriate sensing device coupled to a power line 110, 114 in the vicinity of a power line communication device 138, 139,135 in place of or in addition to the power line current sensor device. In some of the embodiments, the sensor device 115 may perform processing, such as for example, to compute the power factor from the measured current and voltage.

Figure 2:
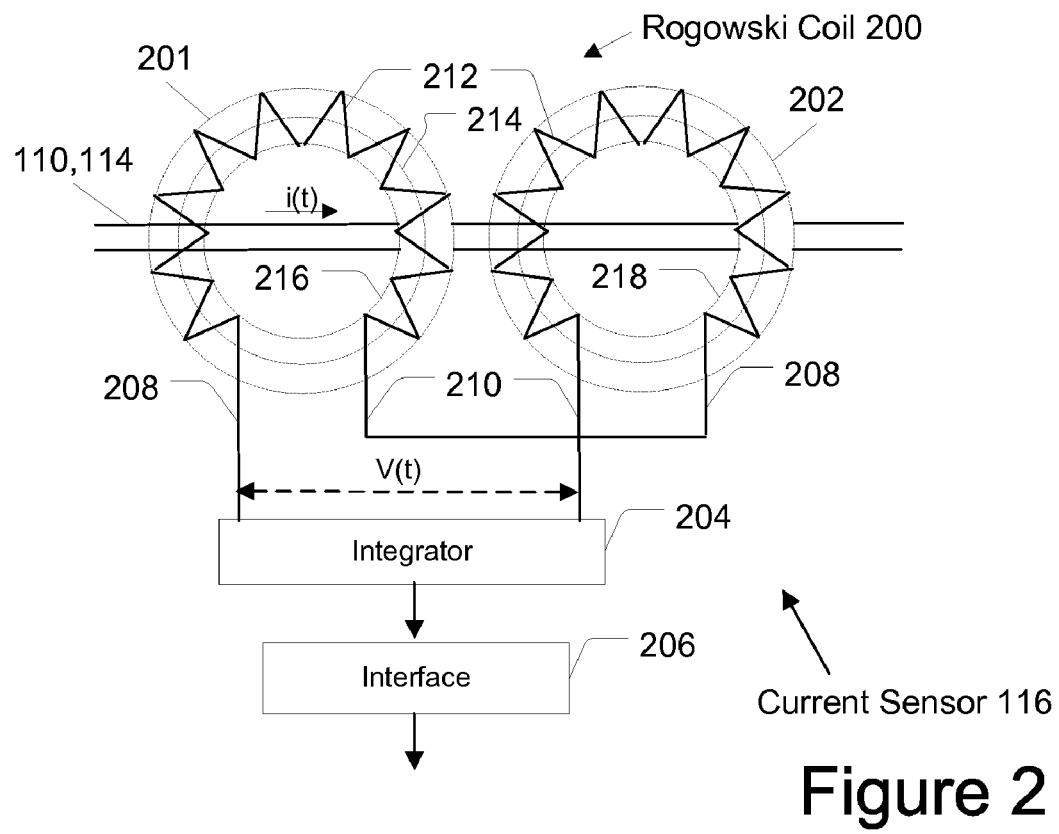
FIG. 2 is a block diagram and partial schematic of an example embodiment of a power line current sensor device.

FIG. 2 shows one example embodiment of a power line parameter sensor device 115, which comprises a power line current sensor device 116 including a Rogowski coil 200 having two loops 201, 202, an integrator 204 and an interface 206. Each loop 201, 202 has a first end 208 and a second end 210. By shaping the loops 201, 202 to bring the two ends 208, 210 toward each other, while leaving space between the ends 208, 210, the Rogowski coil 200 may be readily installed at a power line 110, 114. The coil 200 may have a generally circular shape with an open arc between the ends 208, 210 (to be slipped around the power line) or may be substantially a full closed circle (and formed in two pieces that are hinged together to clamp over the power line). One of ordinary skill in the art will appreciate that other shapes may be implemented. In this example embodiment, to install the current sensor device 116, the two pieces of the loops 201, 202 are clamped around the power line 110, 114 (which may require pulling back the power line neutral conductor for underground power lines). A power line 110, 114 passes through the circular shape as shown. An advantage of these configurations is that the power line 110, 114 may not need to be disconnected (in many instances) to install the current sensor device 116.

The coil 200 of the Rogowski coil may include a first winding 201 wound in a first direction, a second winding 202 wound in a second direction, and wherein said first winding 201 and said second winding 202 each include traces on a printed circuit board. In some embodiments the windings 201, 202 are traced on one or more printed circuit boards (PCBs) 216, 218, and then the printed circuit boards (if more than one) are coupled together to form a monolithic PCB assembly (i.e., one structure). In another embodiment, the two windings of the coil are traced together and interwoven with each other on the PCB (a multi-layer printed circuit board) and therefore may be referred to as being "coupled" together. Because the windings are traced within each other (that is, the loops are interwoven), the loops are not identical in form. In another embodiment, the windings may be traced separately on separate PCBs and have identical geometries on separate PCBs, and be positioned along the power line 110, 114 in close proximity.

As alternating current flows through the power line 110, 114, a magnetic field is generated inducing an electrical field (i.e. voltage) within each winding 201, 202 of the Rogowski coil 200. However, other sources of electromagnetic interference also may induce current flow in the windings 201, 202. By including a left-hand winding 201 and a right-hand winding 202 (i.e., windings in substantially opposite directions) with equally spaced windings, the effects from external sources are largely cancelled out. In particular, external fields from sources outside the Rogowski coil 200, such as other power lines or power line communication and distribution equipment, generate equal but opposite electrical flow in the windings 201, 202. The Rogowski coil 200 provides an instantaneous voltage measurement that is related to the alternating current (AC) flowing through the power line 110, 114.

Each winding 201, 202 of the Rogowski coil 200 comprises an electrical conductor 212 wound around a non-magnetic (e.g., a dielectric, or a material having pr (relative permeability) substantially equal to one) core 214 (e.g., a PCB). In an example embodiment each loop 201, 202 has windings that are wound with a substantially constant density and a core 214 that has a magnetic permeability that may be equal to the permeability of free space $\mu_o$ (such as, for example, air) or a printed circuit board. In addition, the cross section of the core 214 may be substantially constant.

To obtain an expression for the voltage that is proportional to the current flowing through the power line 110, 114, the coil output voltage, v(t), may be integrated. For example, the integrator 204 may convert the measured voltage v(t) into a value equating to measured current. In example embodiments, the integrator 204 may comprise a resistor-capacitor (RC) integrator, an operational amplifier integrator, a digital filter (integrator), another circuit or a processor. Observing that the voltage v(t), is proportional to the derivative of the current being measured, and that if that current is sinusoidal, the voltage v(t) will also be sinusoidal. Thus, determining the current does not always require integration of the voltage v(t)), in which embodiment the integrator 204 may be omitted.

Referring to FIGS. 2-5, each power line distribution parameter sensor device 115 may include an interface 206 which provides communications with a power line communication device, such as a backhaul device 138, an access device 139, a repeater 135, or other communication device. In various embodiments different interfaces 206 may be implemented. In some embodiments the sensor device 115 may include an analog to digital converter (ADC). In other embodiments, raw analog data is communicated from the sensor device 115 to the power line communication device, which may convert the analog data to digital data (via an ADC) and provide processing. Such processing may include, for example, time stamping, formatting the data, normalizing the data, converting the data (e.g., converting the voltage measured by the ADC to a current value), removing an offset, and other such data processing. The processing also may be performed in the sensor device 115, in the power line communication device. Thus, the sensor device 115 of some embodiments may include a controller, an analog to digital converter (ADC), and a memory coupled to said ADC (perhaps via a controller) and configured to store current data. Alternately, the data may be transmitted to the power line server 118 or another remote computer for processing.

The overhead medium voltage power lines typically are not insulated. Thus, for sensor devices 115 which contact (e.g., are to be clamped around for a Rogowski coil) an overhead medium voltage power line or other high voltage conductor, it may be necessary to isolate the voltage (which may be 5,000-10,000 volts or more) of the power line (to which the power line parameter sensor device 116 is mounted) from the power line communication device 138, 139, 135 and other non-MV power line devices. The communication path of the measured data may comprise a non-conductive communication link that allows the data to be communicated but that does not conduct the high voltages of the MV or other power lines. For power line parameter sensor devices 115 which are clamped around an underground power line, isolation may not be necessary because underground power lines are insulated and, therefore the sensor devices 115 do not come into contact with the medium voltage.

Figure 3:
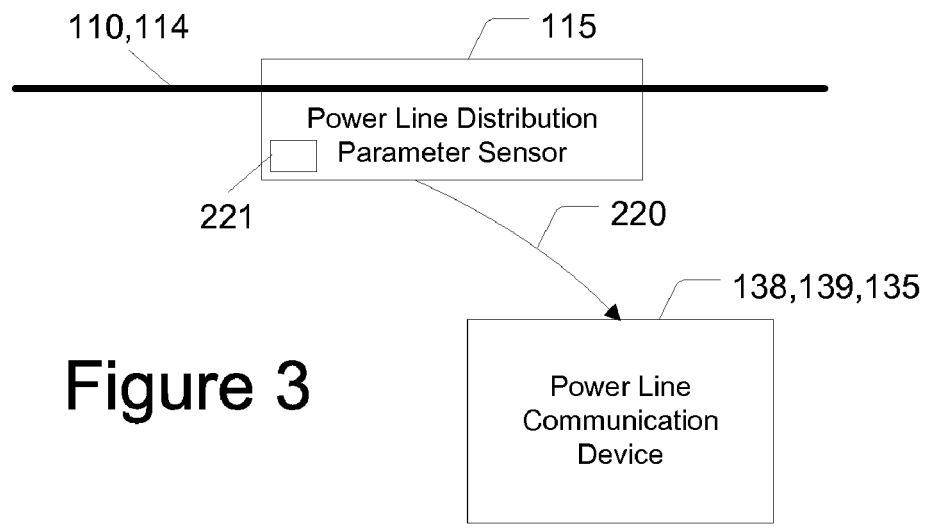
FIG. 3 is a block diagram of an example embodiment of a power line parameter sensor device coupled to a power line communication device.
Figure 4:
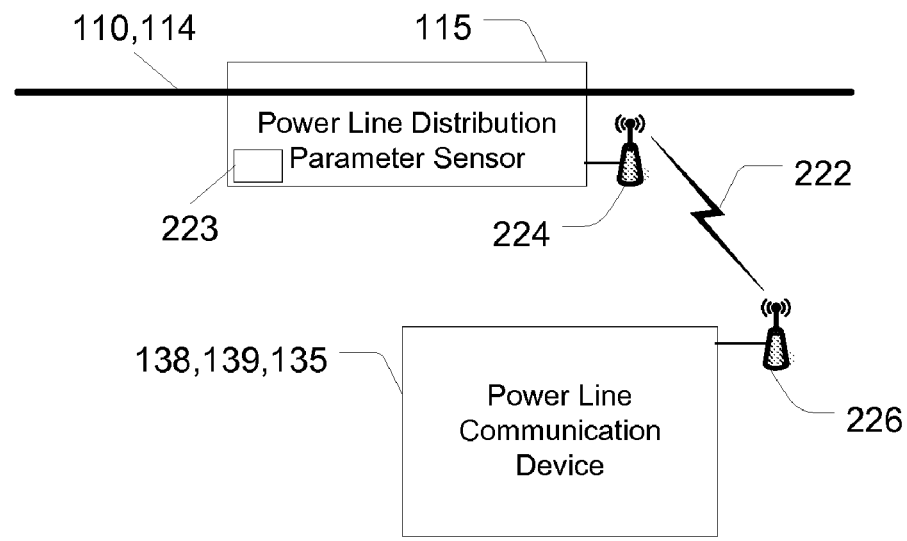
FIG. 4 is a block diagram of an example embodiment of a power line parameter sensor device coupled to a power line communication device by a wireless medium.
Figure 5:
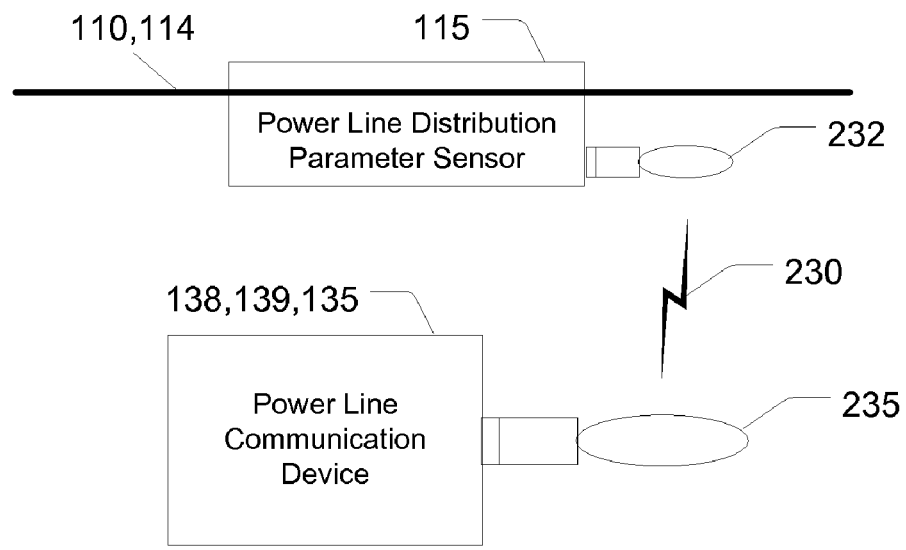
FIG. 5 is a block diagram of another example embodiment of a power line parameter sensor device coupled to a power line communication device by a wireless medium.

FIGS. 3, 4 and 5 show different manners of coupling the power line parameter sensor device 115 to the power line communication device 138,139,135, via a non-conductive communication link to provide electrical isolation (when necessary) from the medium voltage power line 110. In FIG. 3, a wired medium 220 carries measurement data from the power line parameter sensor device 115 to the power line communication device 138, 139, 135. For underground insulated MV power lines and for low voltage power lines (which are also usually insulated), the wired medium 220 may comprise a conductive wire (i.e., a pair or wires). For overhead un-insulated MV power lines, however, the wired medium 220 may include a fiber optic cable or other wired medium that does not conduct high voltages. In such embodiment the power line parameter sensor device 115 and power line communication device 138,139,135 each may include a fiber optic transceiver (or fiber optic transmitter in the sensor device 115 and an optic receiver in the communication device). The fiber optic cable may carry analog or digitized sensor data to the power line communication device 138, 139, 135. In some embodiments such as this one, the sensor device 115 may require a power source (i.e., an energy harvesting system) for powering the fiber optic transceiver and other components (such as an ADC) of the sensor device 115. In one example embodiment, power may be sent over a fiber optic cable as an optical signal from the power line communication device 138, 139, 135 (or another device) to the sensor device 115, where the photonic energy is converted to electrical energy to power the fiber optic transmitter (that may form part of a transceiver) and other components of the power line parameter sensor device 115 via a power supply 221. In other words, a photonic power delivery system may be used whereby light from a laser source illuminates a highly efficient photovoltaic power converter at the sensor device 115 to produce electrical power. An example embodiment of a photonic power supply system and method is described in U.S. patent application Ser. No. 10/292,745 filed on Nov. 12, 2002, entitled, "Floating Power Supply and Method of Using the Same," which is incorporated herein by reference in its entirety. In an alternative embodiment the power line parameter sensor device 115 may include a different power system, such as a solar cell or battery, or kinetic energy converter (e.g., to convert vibrations to electrical energy), to provide power to the sensor device 115 circuits. As still another alternative, a power supply 221 may derive power from the power line 110 via inductance. Specifically, a transformer may be formed by a magnetically permeable core placed substantially around the entire circumference of power line 110 (perhaps with a gap) and a winding around the core. In still another embodiment, a reverse bias winding may be included around the core (e.g., instead of using an air gap) to allow the 60 Hz signal to be inductively coupled to the reverse bias winding to reduce the flux density in the core and thereby increase the amount of current needed to saturate the core. The power line 110, core, and winding form a transformer with the winding connected to the power supply 221. Current through the power line 110 induces a current in the winding, which supplies power to the sensor device 115 (for use by its transmitter and/or other components). Collectively, such power sources such as these (photonic, solar, battery, kinetic (e.g., from vibrations), and inductive power systems), which derive power via a method that isolates the MV power line voltage from the LV power line and the power line communication device, shall be referred to herein as an isolated power source. Isolated power sources other the examples described herein may be employed as well.

FIG. 4 shows an embodiment in which a wireless link 222 carries measurement data from the power line parameter sensor device 115 to the power line communication device 138, 139,135. In such embodiment the interface 206 may include a wireless transceiver 224 (e.g., IEEE 802.11 a,b,g, or n or Bluetooth®, ISM band transceiver, wireless paging receiver/transmitter, or mobile telephone transceiver) or wireless transmitter which communicates with a wireless transceiver 226 (or receiver) of the power line communication device 138,139,135. In some such embodiments the power line parameter sensor device 116 also may include a power supply 223 with an isolated power source such as a solar cell, battery, a photonic power source, or an MV inductive power source, to provide power to the sensor device 115 circuits. When multiple sensor devices 115 are connected to a power line communication device 138, 139, or 135, the wireless methods may include means for coordinating the transmissions from individual sensor devices 115 so that they do not interfere with each other and so that the power line communication device can determine the source of the data. For example, a transceiver may use the ISM bands (915 MHz) and use an "ID Code" embedded in the data to identify the sensor device 115. Alternately, the links may communicate via different frequency bands.

FIG. 5 shows another embodiment in which a wireless link 230 carries measurement data from a radio frequency identification (RFID) transponder 232 of a power line parameter sensor device 115 to the power line communication device 138, 139, 135. In various embodiments the sensor transponder 232 may be passive (having no power source of its own) or active (having its own power source). For example, in one embodiment the interface includes a passive radio transponder 232. The power line communication device 138,139,135 also includes a transponder 235 which transmits a signal to the power line parameter sensor device 115. The strength of the transmitted signal may provide enough power to drive the power line parameter sensor transponder 232 and, if necessary, the sensor's 115 other components as well. The sensor device 115 powers up, gathers one or more samples of the power line current, voltage, and/or other data, and transmits the sampled data back to the power line communication device 138,139,135 via transponder 232. In another embodiment the sensor device includes an active radio transponder having its own power supply, which may have an isolated power source as described herein.

In various embodiments, data from the sensor devices 115 of the system or within a region or neighborhood covered by a sub-portion of the system may be sampled substantially simultaneously (e.g., all sensor devices 115 sample within a thirty second, sixty second, three minute, or five minute time period). Such samples may be gathered at a set scheduled time, at regular times, at regular intervals, or in response to a command received from a remote computer. Uses of the measured (and processed) power line parameter data are described below in more detail.

In the embodiments described herein and others, the invention may employ a communication method that reduces the power needed to communicate the measured data over the non-conductive communication link. Specifically, reducing the power needed to communicate the data allows the sensor device to communicate data when very little power is available (e.g., from the isolated power source). In one example embodiment, the sensor device 115 includes a timing circuit that periodically wakes up the sensing and memory circuits (e.g., analog to digital converter and memory) from a reduced power state (e.g., hibernation or standby state) to allow the measurement(s) to be taken (samples converted to digital data), processed, and stored in memory. In addition, after a predetermined number of measurements have been taken and the associated data stored, the communication circuitry of the interface 206 may be woken up to transmit the stored data to the power line communication device 138, 139, 135 via the non-conductive communication link (e.g., the fiber optic conductor, through the air via a wireless transmitter or transceiver, etc.).

In one example embodiment, the communication circuitry is configured to transmit a plurality of samples of the parameter data in a bursting transmission, which may comprise a relatively high transmission rate and relatively short transmission time. Specifically, over a given time period (e.g., a day) a plurality of bursts of the parameter data may be transmitted, with each burst transmitting data a plurality of the stored samples. The bursting at high data rates may allow the transmitter of the interface 206 of the sensor device 206 to remain powered down (or in a low power use state) a high percentage of the time. The bursting transmission over a time period (e.g., an hour or day) may have an extremely low duty cycle such as less than 0.01 (1%), more preferably less than 0.001 (0.1%), even more preferably less than 0.0001 (0.01%), and still more preferably less than 0.00001 (0.001%).

Figure 6:
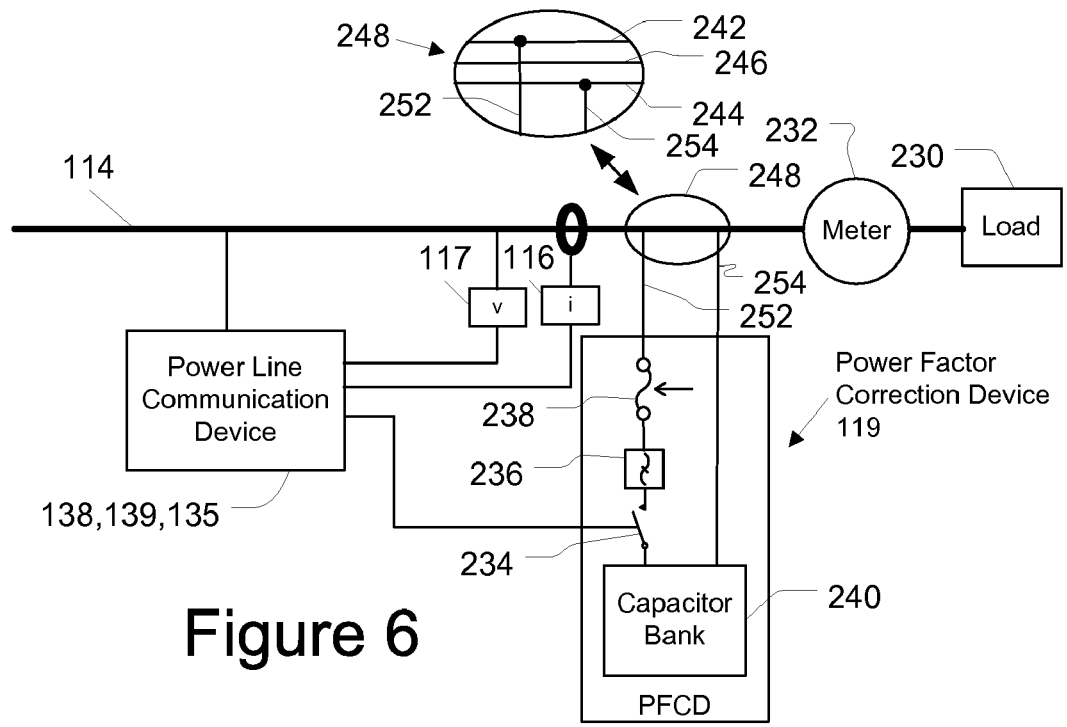
FIG. 6 illustrates an implementation of an example embodiment of a power factor correction device coupled to a portion of a power distribution network.

Power Factor Correction Device:

FIG. 6 shows a portion of a power distribution system in which a load 230 receives power from a low voltage (LV) power line 114. The LV power line 114 may include three conductors: two energized conductors 242, 244 and one neutral conductor 246. In an example in which the load 230 is at a customer's premises, a utility meter 232 may be coupled to the external LV power line 114 at the ingress of the power lines 114 to the customer premises. Internal power lines may couple various appliances and user devices in the customers to the external LV power lines 114. Also coupled to the LV power line 114 may be a power line communication device 138, 139, 135, such as an access device 139, which may be located at or near a distribution transformer. For an access device 139 embodiment, the access device 139 also may be coupled to a medium voltage power line 110 to thereby provide a path for data to bypass the transformer. In addition one or more power line distribution parameter sensing devices 115 may be coupled to the LV power line 114. For example, a voltage sensor device 117 and a current sensor device 116 may be used to obtain information for monitoring power factor of the LV power lines as shown.

According to one example embodiment of the invention, a power factor correction device (PFCD) 119 is coupled to the LV power line 114 and to the power line communication device 138, 139, 135. The PFCD 119 receives a control message from the power line communication device 138, 139, 135. In response, the PFCD 119 may connect a capacitive load to the LV power line 115 to thereby modify the power factor of the LV power line 114. The change in power factor may be monitored by the power line communication device 138, 139, 135 via the sensor devices 116, 117.

The power factor correction device 119 may include a switching circuit 234, a filter 236, a fuse 238, and a capacitor bank 240. In the illustrated embodiment the components 234-240 are coupled in series across the two energized conductors 242, 244 of the LV power line 114. The capacitor bank 240 may include one or more capacitors. The switching circuit 234 controls the configuration of the capacitor bank 240 to determine the amount of capacitive load to connect to the LV power lines based on the received control message. Specifically, the switching circuit 234 may connect zero, one or more capacitors across the two energized conductors 242, 244 (or in another embodiment to the neutral). (Switching circuit 234 is shown as a single pole single throw switch for ease of illustration and may include numerous poles and/or may be a semi-conductor switch.) In some embodiments bleed resistors also may be included across the capacitor bank 240. The filter 236 may comprise a low pass filter to filter nonlinear signal components and harmonics that inadvertently may be injected onto the LV power line 114 from the capacitor bank 240. In addition, the filter 236 may serve to prevent power line communication signals from traveling through the capacitor bank. The fuse 238 may be included as a safety precaution to prevent a high current from one power line from damaging the PFCD 119 or reaching the other power line conductor 242, 246. Figure label 248 represents a portion of the LV power line 114 showing the three LV power line conductors 242, 244, 246, along with the connections 252, 254 between the PFCD 119 and the two energized conductors 242, 244. In some embodiments, the sensing device may comprise a semiconductor that provides an output of the power factor (e.g., based on inputs proportional to the voltage and current of the power line). In addition, instead of being root mean square (RMS) measurements, the measurements for providing power factor data may be sampled (actual or relative values) measurements of the voltage and current of the power signal over one or more 60 Hz cycles in order to determine the phase relationship.

For example, the power line communication device 138, 139, 135 may sample the voltage and current over a portion of one or more 60 hertz cycles to determine the power factor. In one example embodiment the measurements are real-time actual measurements taken over multiple cycles. The power factor is derived from the obtained measurements by a process performed, according to the embodiment, a sensor device 115, a power line communication device, or a utility data processing center (e.g., power line server). In this example embodiment the power line communication device 138, 139, 135 performs the process and then compares the derived power factor with a table of power factors (stored in memory) to determine the appropriate configuration for the capacitor bank 240. The power line communication device then transmits the control message to the switching circuit 234 causing the capacitor bank 240 to be configured as desired to adjust the power factor. In one embodiment, transmission of the control message is timed so that the change of the capacitive load provided by capacitor bank 130 is at or near a zero crossing(e.g., within ten percent of zero crossing (temporally) or the voltage is less than ten percent of its peak) of the power signal (thereby reducing the surge). The process may be repeated to periodically adjust the power factor so as to achieve a desired power factor (e.g., a power factor approaching one).

In one embodiment the switching circuit 234 may include a semiconductor switch (or another very fast switch). A fast switching speed may be desired in some embodiments so as to more easily synchronize the switch transition with the zero crossing of the 60 hertz power signal. For such an embodiment, the bleed resistors may be omitted.

The power line communication device 138, 139, 135 may monitor and adjust power factor periodically and in real time, and also transmit the power factor data to a remote computer, such as the power line server 118 (see FIG. 1). The remote computer may transmit updated data for the table of power factors in the power line communication device to alter the process for adjusting the power factor, (e.g., change the capacitor bank configuration to be applied in response to a given power factor).

In some embodiments additional processes may be implemented to determine how to change the power factor. For example, the power line server may receive information of the power factor, load or other power distribution parameters and determine a course of power factor adjustment across multiple portions of a power distribution network. For example, capacitors banks may be coupled to medium voltage power lines for use in adjusting the load of a region of the power distribution network. Some of such power factor correction may be performed at multiple PFCDs 119 in a coordinated manner. Thus, the power line server 118 may coordinate the connection of capacitor banks 240 to supplement the capacitive reactance provided by MV power line capacitor banks. Accordingly, in response to gathered power factor data or other power line parameter data, the power line server 118 may select and transmit commands to one or more power line communication devices 138, 139, 135 causing selectively increase the capacitive load provided by combinations of capacitors banks 240 coupled to power lines. Such commands may specify the amount of capacitance, the location of the capacitors, a reactance value, and/or another appropriate indication sufficient to allow the power line communication device to provide the appropriate control message. The capacitor bank 240 configuration also may be adjusted so as to control voltage along the power line, (e.g., when voltage is low, capacitors may be connected to increase the power line voltage over a specific portion of the LV power line 114).

Figure 7A:
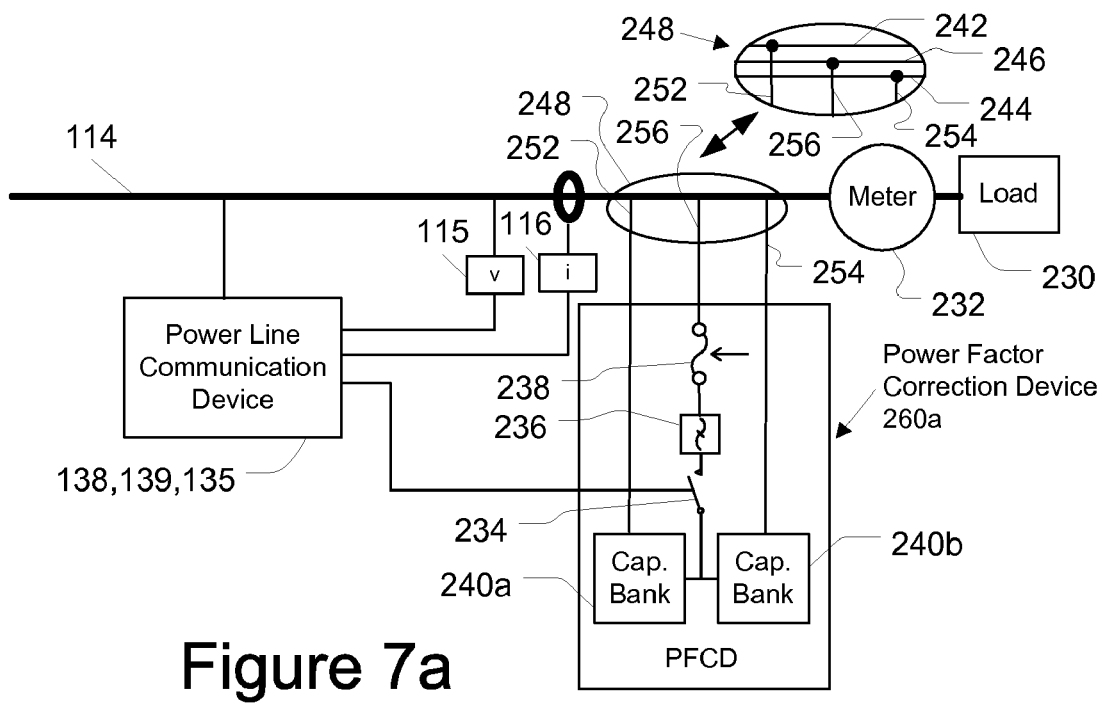
FIGS. 7a-b illustrate implementations of other example embodiments of power factor correction devices coupled into a portion of a power distribution network.
Figure 7B:
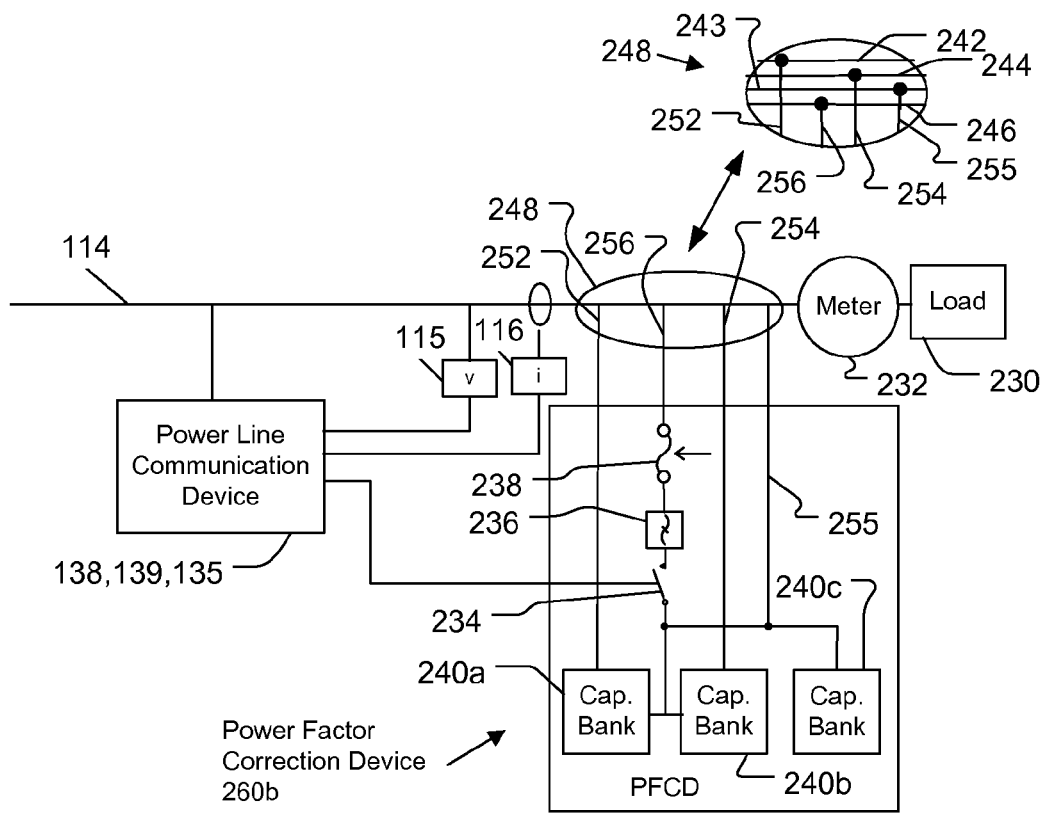

FIGS. 7a and 7b show a portion of a power distribution system in which another embodiment of a power factor correction device (PFCD) 260 is coupled to the LV power line 114. FIG. 7a illustrates an embodiment for use wherein two energized power lines (and one neutral) are used to provide power to the structure (e.g., typical residential configuration) and FIG. 7b illustrates an embodiment for use wherein three energized power lines (and one neutral) are used to provide power to the structure (e.g., typically a business or commercial customer). Like parts are given like numbers in FIGS. 6 and 7 and perform similar functions. The PFCD 260a,b of FIGS. 7a,b are similar to the PFCD 119 of FIG. 6, including a switching circuit 234, a filter 236 and a fuse 238. The PFCD 260a, however, includes two capacitor banks 240a, b and PFCD 260b includes the capacitor banks 240a,b,c. One capacitor bank 240a is coupled to one of the energized conductors 242 of the LV power line 114, while the other capacitor bank 240b is coupled to the other energized conductor 244. For the embodiment of FIG. 7b, capacitor bank 240c is connected to the third energized conductor 243. Each embodiment 260a,b, the switching circuit 234, filter 236 and fuse 238 are coupled in series between the neutral conductor 246 of the LV power line and the capacitor banks 240a, 240b (and 240c for PFCD 26b of FIG. 7b). The switching circuit 234 controls the configuration of the capacitor banks 240a and 240b (and 240c for PFCD 26b of FIG. 7b). (Switching circuit 234 is shown as a single pole single throw switch for ease of illustration and may include numerous poles and/or may be a semi-conductor switch.) In a preferred embodiment the configuration of each capacitor bank 240a, 240b (and 240c for PFCD 26b of FIG. 7b) is the same, with the switching circuit 234 configuring each bank 240a,b (and 240c for PFCD 26b of FIG. 7b) to adjust the capacitive load by connecting zero, one or more capacitors (or each capacitor bank 240) between a respective energized conductor 242, 244 and the neutral 246. In other embodiments, the switching circuit 234 may control each bank 240 separately so that a different capacitive load can be provided to each energized conductor 242, 244, 243.

In some embodiments the power line communication device 138, 139, 135 may detect a failure of capacitor bank 240 or a specific capacitor within a specific capacitor bank 240. For example, the power line communication device may detect that power factor did not change by an expected amount (or at all) in response to a control message to increase (or decrease) a capacitive load. Such failure may be reported to a remote computer, such as to the power line server 118, via notification transmitted from the power line communication device 138, 139, 135. In various embodiments the connection between the power line communication device 138, 139, 135 and the power factor correction device 119, 260 may be by an optical fiber, cable, power line, wired or wireless medium.

In various embodiments the power factor correction device 119, 260 may be located at or near a distribution transformer (e.g., mounted on a utility pole or inside a transformer enclosure), at the ingress of the power lines to a customer premises (e.g., near a utility meter 232), or along an external LV power line 114 between the transformer and utility meter 232. Further, the power factor correction device 119, 260 may be located at or in a multi-dwelling unit (e.g., an apartment or office). The PFCD 119, 260 may be co-located with a communication device or remote therefore. Depending on the embodiment, the PFCD may connected to a medium voltage power line, wherein the measurements may taken from a low voltage power line (on the other side of a distribution transformer) or the MV power line.

In one example embodiment, the power factor correction device 119, 260 may be co-located with the power line communication device 138, 139, 135 (and distribution transformer) and connected to the LV power lines 114 that extend from the distribution transformer. As is known in the art, the external power lines 114 typically split off to a plurality of customer premises thereby forming an LV power line subnet. By connecting the PFCD 119, 260 to the LV power lines 114 before the split (on the distribution transformer side of the split), the PFCD 119, 260 may be used to modify and correct the power factor for the entire LV power line subnet.

In another example embodiment, the power factor correction device 119, 260 may be co-located with the meter 232 and communicate with the power line communication device 138, 139, 135 via the external LV power lines 114 that extend from the distribution transformer. In this embodiment, the PFCD 119, 260 may include a communication module (e.g., a modem) and a control module to receive and respond to control messages from the power line communication device 138, 139, 135 that may be remote (e.g., at the distribution transformer). Thus, one power line communication device 138, 139, 135 may communicate with and control a plurality of power factor correction devices 119, 260 connected to the LV power lines 114 and disposed at different customer premises. In a variation of this embodiment, the meter 232 may include the communication module (e.g., a modem) and control module for communicating with the power line communication device 138, 139, 135 and provide control messages to the PFCD 119, 260. By connecting the PFCD 119, 260 to the LV power lines 114 at the customer premises, each PFCD 119, 260 may be used to modify and correct the power factor for a customer premise and be controlled by a single power line communication device 138,139,135.

Backhaul Node 132 with Backhaul device 138:

Other communication nodes, such as access nodes, repeaters, and other backhaul nodes, may communicate to and from the IP network via a backhaul node 132. In one example embodiment, a backhaul node 132 comprises a backhaul device 138. The backhaul device 138, for example, may transmit communications directly to an aggregation point 124, or to a distribution point 127 which in turn transmits the data to an aggregation point 124.

Figure 8:
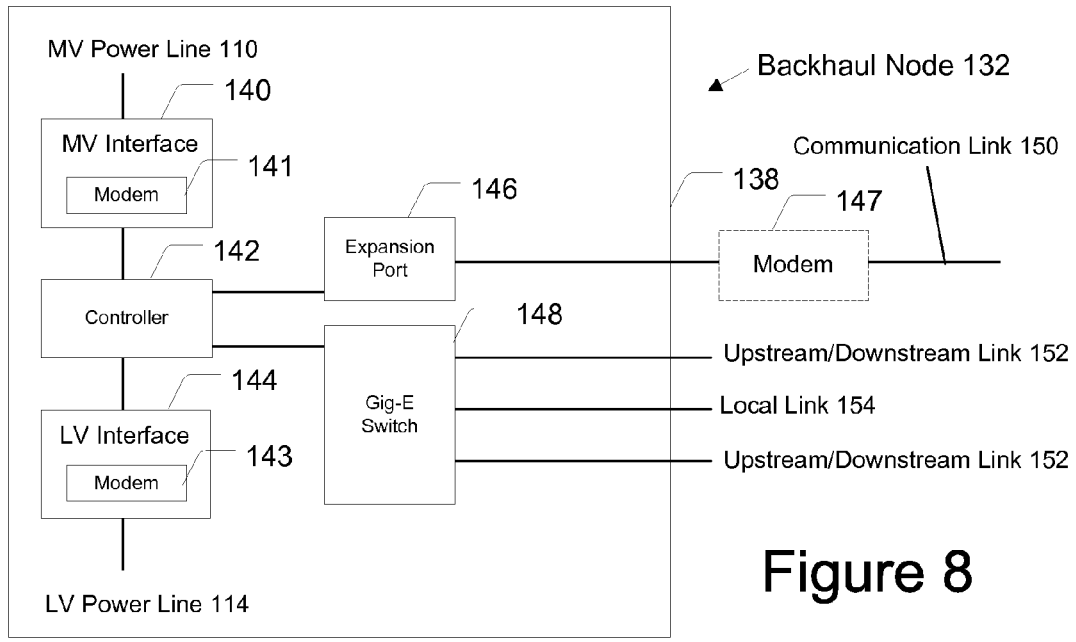
FIG. 8 is a block diagram of an example embodiment of a backhaul node.
Figure 9:
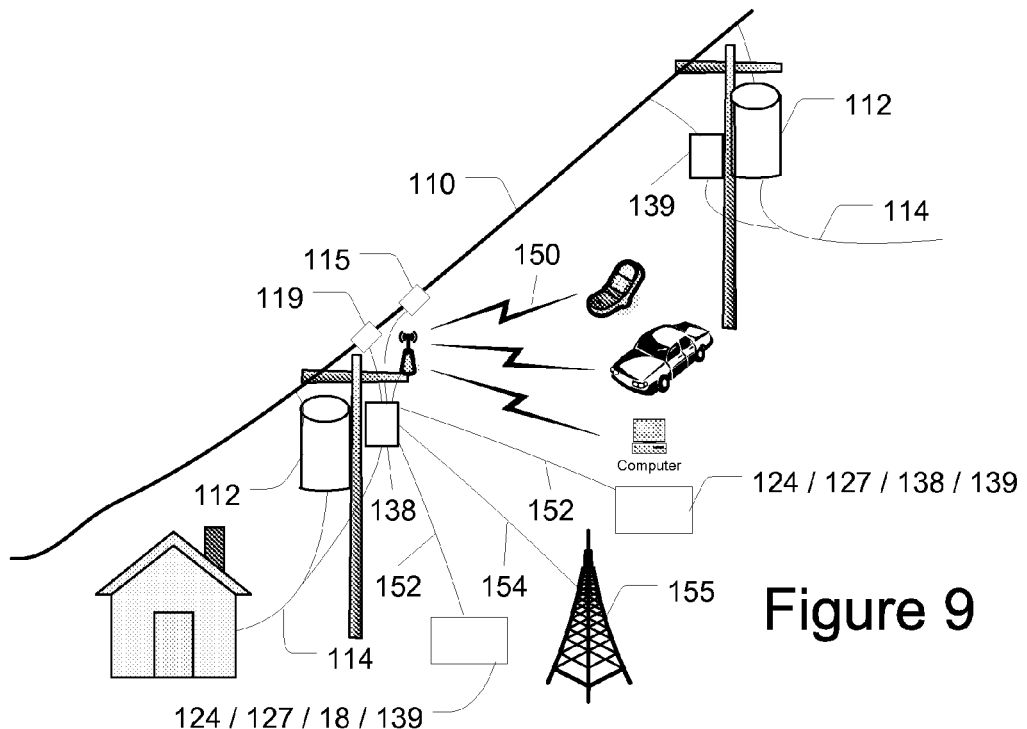
FIG. 9 illustrates a deployment of an example embodiment of a backhaul node capable of transmitting data over a variety of communications media.

FIGS. 8 and 9 illustrates an example embodiment of a backhaul device 138 which may form all or part of a backhaul node 132. The backhaul device 138 may include a medium voltage power line interface (MV Interface) 140, a controller 142, an expansion port 146, and a gigabit Ethernet (gig-E) switch 148. In some embodiments the backhaul device 138 also may include a low voltage power line interface (LV interface) 144. The MV interface 140 is used to communicate over the MV power lines and may include an MV power line coupler coupled to an MV signal conditioner, which may be coupled to an MV modem 141. The MV power line coupler prevents the medium voltage power from passing from the MV power line 110 to the rest of the device's circuitry, while allowing the communications signal to pass between the backhaul device 138 and the MV power line 110. The MV signal conditioner may provide amplification, filtering, frequency translation, and transient voltage protection of data signals communicated via the MV power lines 110. Thus, the MV signal conditioner may be formed by a filter, amplifier, a mixer and local oscillator, and other circuits which provide transient voltage protection. The MV modem 141 may demodulate, decrypt, and decode data signals received from the MV signal conditioner and may encode, encrypt, and modulate data signals to be provided to the MV signal conditioner.

The backhaul device 138 also may include a low voltage power line interface (LV Interface) 144 for receiving and transmitting data over an LV power line 114. The LV interface 144 may include an LV power line coupler coupled to an LV signal conditioner, which may be coupled to an LV modem 143. In one embodiment the LV power line coupler may be an inductive coupler. In another embodiment the LV power line coupler may be a conductive coupler or capacitive coupler. The LV signal conditioner may provide amplification, filtering, frequency translation, and transient voltage protection of data signals communicated via the LV power lines 114. Data signals received by the LV signal conditioner may be provided to the LV modem 143. Thus, data signals from the LV modem 143 are transmitted over the LV power lines 110 through the signal conditioner and LV coupler. The LV signal conditioner may be formed by a filter, amplifier, a mixer and local oscillator, and other circuits which provide transient voltage protection. The LV modem 143 may demodulate, decrypt, and decode data signals received from the LV signal conditioner and may encode, encrypt, and modulate data signals to be provided to the LV signal conditioner.

The backhaul device 138 also may include an expansion port 146, which may be used to connect to a variety of devices. The expansion port 146 may facilitate communication with multiple devices (concurrently) have a plurality of physical ports. For example a wireless access point, which may include a wireless transceiver or modem 147, may be integral to or coupled to the backhaul device 138 via the expansion port 146. The wireless modem 147 may establish and maintain a wireless communication link 150. In other embodiments a communication link is established and maintained over an alternative communications medium (e.g., fiber optic, cable, twisted pair) using an alternative transceiver device. In such other embodiments the expansion port 146 may provide an Ethernet connection allowing communications with various devices over optical fiber, coaxial cable or other wired medium. In such embodiment the modem 147 may be an Ethernet transceiver (fiber or copper) or other suitable modem may be employed (e.g., cable modem, DSL modem). In other embodiments, the expansion port 146 may be coupled to a Wifi access point (IEEE 802.11 transceiver), WiMAX (IEEE 802.16), or mobile telephone cell site. The expansion port 146 may be employed to establish a communication link 150 between the backhaul device 138 and devices at a residence, building, other structure, another fixed location, or between the backhaul device 138 and a mobile device.

The power factor correction device 119, 260 may be connected to the backhaul device 138 through the expansion port 146 or via another interface. Likewise, various sensors also may be connected to the backhaul device 138 through the expansion port 146. Exemplary sensing devices that may be coupled to the backhaul device 138 through the expansion port 146 include one or more of a current sensor, power usage sensing device, a level sensor (to determine pole tilt), a camera (e.g., for monitoring security, detecting motion, monitoring children's areas, monitoring a pet area), an audio input device (e.g., microphone for monitoring children, detecting noises), a vibration sensor, a motion sensor (e.g., an infrared motion sensor for security), a home security system, a smoke detector, a heat detector, a carbon monoxide detector, a natural gas detector, a thermometer, a barometer, a biohazard detector, a water or moisture sensor, a temperature sensor, and a light sensor. The expansion port may provide direct access to the core processor (which may form part of the controller 142) through a MII (Media Independent Interface), parallel, serial, or other connection. This direct processor interface may then be used to provide processing services and control to devices connected via the expansion port 256 thereby allowing connection of a less expensive device (e.g., sensor).

The power parameter sensor device 115 may measure and/or detect one or more parameters, which, for example, may include power usage data, power line voltage data, power line current data, detection of a power outage, detection of water in a pad mount, detection of an open pad mount, detection of a street light failure, power delivered to a transformer data, power factor data (e.g., the phase angle between the voltage and current of a power line), power delivered to a downstream branch data, data of the harmonic components of a power signal, load transients data, and/or load distribution data. In addition, the backhaul device 138 may include multiple sensor devices 115 so that parameters of multiple power lines may be measured such as a separate parameter sensor device 116 on each of three MV power line conductors and a separate parameter sensor on each of two energized LV power line conductors and one on each neutral conductor. One skilled in the art will appreciate that other types of utility data also may be gathered.

The backhaul device 138 also may include a gigabit Ethernet (Gig-E) switch 148. Gigabit Ethernet is a term describing various technologies for implementing Ethernet networking at a nominal speed of one gigabit per second, as defined by the IEEE 802.3z and 802.3ab standards. There are a number of different physical layer standards for implementing gigabit Ethernet using optical fiber, twisted pair cable, or balanced copper cable. In 2002, the IEEE ratified a 10 Gigabit Ethernet standard which provides data rates at 10 gigabits per second. The 10 gigabit Ethernet standard encompasses seven different media types for LAN, MAN and WAN. Accordingly the gig-E switch may be rated at 1 gigabit per second (or greater as for a 10 gigabit Ethernet switch).

The switch 148 may be included in the same housing or co-located with the other components of the node (e.g., mounted at or near the same utility pole or transformer). The gig-E switch 148 maintains a table of which communication devices are connected to which switch 148 port (e.g., based on MAC address). When a communication device transmits a data packet, the switch receiving the packet determines the data packet's destination address and forwards the packet towards the destination device rather than to every device in a given network. This greatly increases the potential speed of the network because collisions are substantially reduced or eliminated, and multiple communications may occur simultaneously.

The gig-E switch 148 may include an upstream port for maintaining a communication link 152 with an upstream device (e.g., a backhaul node 132, an aggregation point 124, a distribution point 127), a downstream port for maintaining a communication link 152 with a downstream device (e.g., another backhaul node 134; an access node 134), and a local port for maintaining a communication link 154 to a Gig-E compatible device such as a mobile telephone cell cite 155 (i.e., base station), a wireless device (e.g., WiMAX (IEEE 802.16) transceiver), an access node 134, another backhaul node 132, or another device. In some embodiments the gig-E switch 148 may include additional ports. The Gig-E switch 148 (via local link 154, or downstream link 154), expansion port 146, and/or LV Interface 144 may be coupled to one or more interface devices 102/202 for providing communications to and from one or more pieces of automated power distribution equipment 115.

In one embodiment, the local link 154 may be connected to mobile telephone cell site configured to provide mobile telephone communications (digital or analog) and use the signal set and frequency bands suitable to communicate with mobile phones, PDAs, and other devices configured to communicate over a mobile telephone network. Mobile telephone cell sites, networks and mobile telephone communications of such mobile telephone cell sites, as used herein, are meant to include analog and digital cellular telephone cell sites, networks and communications, respectively, including, but not limited to AMPS, 1G, 2G, 3G, GSM (Global System for Mobile communications), PCS (Personal Communication Services) (sometimes referred to as digital cellular networks), 1× Evolution-Data Optimized (EVDO), and other cellular telephone cell sites and networks. One or more of these networks and cell sites may use various access technologies such as frequency division multiple access (FDMA), time division multiple access (TDMA), or code division multiple access (CDMA) (e.g., some of which may be used by 2G devices) and others may use CDMA2000 (based on 2G Code Division Multiple Access), WCDMA (UMTS)—Wideband Code Division Multiple Access, or TD-SCDMA (e.g., some of which may be used by 3G devices).

The gig-E switch 148 adds significant versatility to the backhaul device 138. For example, several backhaul devices may be coupled in a daisy chain topology (see FIG. 12), rather than by running a different fiber optic conductor to each backhaul node 134. Additionally, the local gig-E port allows a communication link 154 for connecting to high bandwidth devices (e.g., WiMAX (IEEE 802.16) or other wireless devices). The local gig-E port may maintain an Ethernet connection for communicating with various devices over optical fiber, coaxial cable or other wired medium. Exemplary devices may include user devices 130, a mobile telephone cell cite 155, and sensors (as described above with regard to the expansion port 146).

Communications may be input to the gig-E switch 148 from the MV interface 140, LV interface 144 or expansion port 146 (via the controller 142). Communications also may be received at the switch 148 from each of the upstream port, local port and downstream port. The gig-E switch 148 may be configured (by the controller 142 dynamically) to direct the data received from a given input port through the switch 148 to the upstream port, local port, or downstream port as desired. An advantage of the gig-E switch 148 is that communications received at the upstream port or downstream port need not be provided (if so desired) to the controller 142. Specifically, communications received at the upstream port or downstream port need not be buffered or otherwise stored in the controller memory or processed by the controller 142. (Note, however, that communications received at the local port may be directed to the controller 142 for processing or for output over the MV interface 140, LV interface 144 or expansion port 146). The controller 142 controls the gig-E switch 148, allowing the switch 148 to pass data upstream and downstream (e.g. according to parameters (e.g., prioritization, rate limiting, etc.) provided by the controller). In particular, data may pass directly from the upstream port to the downstream port without the controller 142 receiving the data. Likewise, data may pass directly from the downstream port to the upstream port without the controller 142 receiving the data. Also, data may pass directly from the upstream port to the local port in a similar manner; or from the downstream port to the local port; or from the local port to the upstream port or downstream port. Moving such data through the controller 142 would significantly slow communications or require an ultra fast processor in the controller 142. Data from the controller 142 (originating from the controller 142 or received via the MV interface 140, the LV interface 144, or expansion port 146) may be supplied to the Gig-E switch 148 for communication upstream (or downstream) via the upstream port (or downstream port) according to the address of the data packet. Thus, data from the controller 142 may be multiplexed in (and routed/switched) along with other data communicated by the switch 148. As used herein, to route and routing is meant to include the functions performed by of any a router, switch, and bridge.

The backhaul device 138 also may include a controller 142 which controls the operation of the device 138. The backhaul device 138 also may include a router, which routes data along an appropriate path. In this example embodiment, the controller 142 includes program code for performing routing (hereinafter to include switching and/or bridging). Thus, the controller 142 may maintain a table of which communication devices are connected to each port in memory. The controller 142, of this embodiment, matches data packets with specific messages (e.g., control messages) and destinations, performs traffic control functions, performs usage tracking functions, authorizing functions, throughput control functions and similar related services. Communications entering the backhaul device 138 from the MV power lines 110 at the MV interface 140 are received, and then may be routed to the LV interface 144, expansion port 146 or gig-E switch 148. Communications entering the backhaul device 138 from the LV power lines 114 at the LV interface 144 are received, and may then be routed to the MV interface 140, the expansion port 146, or the gig-E switch 148. Communications entering the backhaul point 138 from the expansion port 146 are received, and may then be routed to the MV interface 140, the LV interface 144, or the gig-E switch 148. Accordingly, the controller 142 may receive data from the MV interface 140, LV interface 144 or the expansion port 146, and may route the received data to the MV interface 140, LV interface 144, the expansion port 146, or gig-E switch 148. In this example embodiment, user data may be routed based on the destination address of the packet (e.g., the IP destination address). Not all data packets, of course, are routed. Some packets received may not have a destination address for which the particular backhaul device 138 routes data packets (and may be discarded). Additionally, some data packets may be addressed to the backhaul device 138 itself, in which case the backhaul device 138 may process the data as a control message. The backhaul node may also be coupled to a sensor device 115 and PFCD 119/260 via one or more of the ports described herein.

Figure 10:
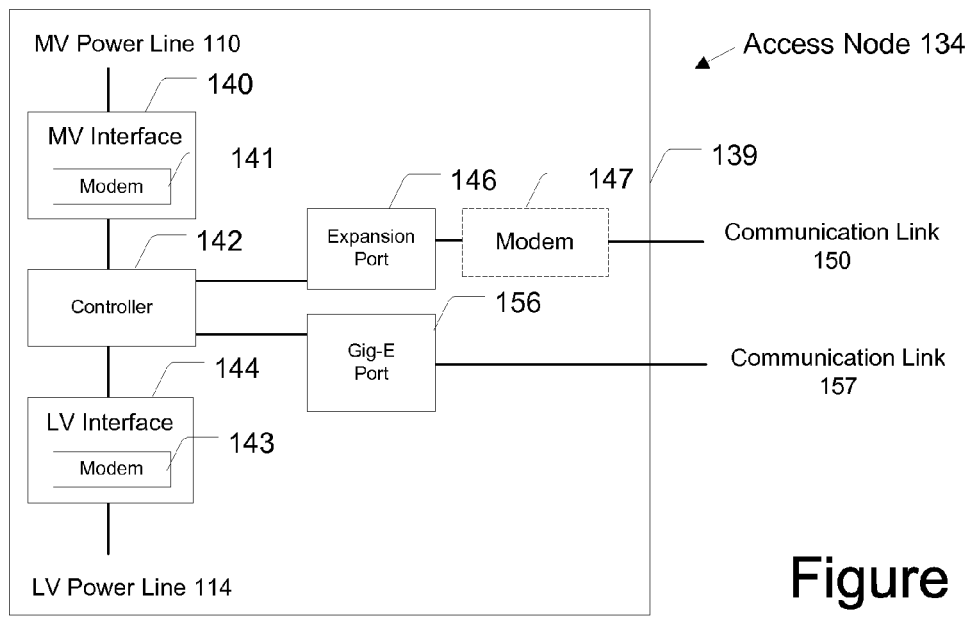
FIG. 10 is a block diagram of an example embodiment of an node device.
Figure 11:
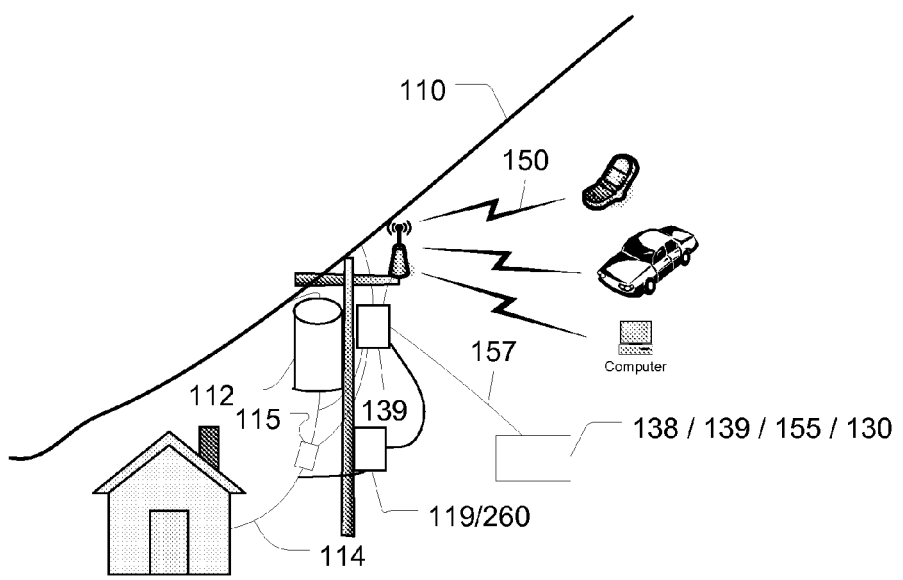
FIG. 11 illustrates an implementation of an example embodiment of an access node capable of transmitting data over a variety of communications media.

Access node 134 with Access Device 139:

The backhaul nodes 132 may communicate with user devices via one or more access nodes 134, which may include an access device 139. FIGS. 10-11 show an example embodiment of such an access device 139 for providing communication services to mobile devices and to user devices at a residence, building, and other locations. Although FIG. 11 shows the access node 134 coupled to an overhead power line, in other embodiments an access node 134 may be coupled to an underground power line.

In one example embodiment, access communication nodes 134 provide communication services for user devices 130 such as security management; IP network protocol (IP) packet routing; data filtering; access control; service level monitoring; service level management; signal processing; and modulation/demodulation of signals transmitted over the communication medium.

The access device 139 of this node 134 may include a bypass device that moves data between an MV power line 110 and an LV power line 114. The access device 139 may include a medium voltage power line interface (MV Interface) 140 having a MV modem 141, a controller 142, a low voltage power line interface (LV interface) 144 having a LV modem 143, and an expansion port 146, which may have the functionality and functional components as previously described above with regard to FIG. 8 of the backhaul device 138. In particular, the expansion port 146 may connect the access device 139 to one or more sensor devices 115 and one or more power factor correction devices 119, 260. The power parameter sensor device 116 may be connected to the access device 139 to measure and/or detect one or more parameters of the MV power or the LV power line, which, for example, may include power usage data, power line voltage data, power line current data, detection of a power outage, detection of water in a pad mount, detection of an open pad mount, detection of a street light failure, power delivered to a transformer data, power factor data (e.g., the phase angle between the voltage and current of a power line), power delivered to a downstream branch data, data of the harmonic components of a power signal, load transients data, and/or load distribution data. In addition, the access device 134 may include multiple sensor devices 115 so that parameters of multiple power lines may be measured such as a separate parameter sensor device 115 on each of three MV power line conductors and a separate parameter sensor on each of two energized LV power line conductors and one on each neutral conductor. One skilled in the art will appreciate that other types of utility data also may be gathered.

The access device 139 also may include a gigabit Ethernet (gig-E) port 156. The gig-E port 156 maintains a connection using a gigabit Ethernet protocol as described above for the gig-E switch 146 of FIG. 8. The Gig-E port 156 may maintain an Ethernet connection for communicating with various devices over optical fiber, coaxial cable or other wired medium. For example, a communication link 157 may be maintained between the access device 139 and another device through the gig-E port 156. As another example, the gig-E port 156 may provide a connection to user devices 130, sensor devices (as described above with regard to the expansion port 146, such as to power line parameter sensor device 115), a power factor correction device 119, 260, or a cell station 155.

Communications may be received at the access device 139 through the MV interface 140, LV interface 144, expansion port 146 or gig-E port 156. Communications may enter the access device 139 from the MV power lines 110 through the MV interface 140, and then may be routed to the LV interface 142, expansion port 146 or gig-E port 156. Communications may enter the access device 139 from the LV power lines 114 through the LV interface 144, and then may be routed to the MV interface 140, the expansion port 146, or the gig-E port 156. Communications may enter the access device 139 from the expansion port 146, and then may routed to the MV interface 140, the LV interface 144, or the gig-E port 156. Communications may enter the access device 139 via the gig-E port 156, and then may be routed to the MV interface 140, the LV interface 144, or the expansion port 146. The controller 142 controls communications through the access device 139. Accordingly, the access device 139 receives data from the MV interface 140, LV interface 144, the expansion port 146, or the gig-E port 156 and may route the data to the MV interface 140, LV interface 144, expansion port 146, or gig-E port 156 under the direction of the controller 142. In one example embodiment, the access node 134 may be coupled to a backhaul node 132 via a wired medium coupled to Gig-E port 156 while in another embodiment, the access node is coupled to the backhaul node 132 via an MV power line (via MV interface 140). In yet another embodiment, the access node 134 may be coupled to a backhaul node 132 via a wireless link (via expansion port 146 or Gig-E port 156). The access node 134 may be coupled to a sensor device 115 and PFCD 119/260 via the expansion port and or one or more other ports (e.g., Gig-E port 156, LVI 144, etc.) for providing power factor correction as described herein.

Other Power Line Communication Devices:

Another communication device is a repeater (e.g., indoor, outdoor, low voltage (LVR) and/or medium voltage) which may form part of a repeater node 135 (see FIG. 1). A repeater serves to extend the communication range of other communication elements (e.g., access devices, backhaul points, and other nodes). The repeater may be coupled to power lines (e.g., MV power line; LV power line) and other communication media (e.g., fiber optical cable, coaxial cable, T-1 line or wireless medium). Note that in some embodiments, a repeater node 135 may also include a device for providing a link to a user device 130 (and thus also serve as an access node 134).

In various embodiments a user device 130 is coupled to an access node 134 using a modem. For a power line medium, a power line modem 136 is used. For a wireless medium, a wireless modem is used. For a coaxial cable, a cable modem is may be used. For a twisted pair, a DSL modem may be used. The specific type of modem depends on the type of medium linking the access node 134 and user device 130.

In addition, the PLCS may include intelligent power meters, which, in addition to measuring power, may include a parameter sensor device 115 and also have communication capabilities (a controller coupled to a modem coupled to the LV power line) for communicating the measured parameter data to the access node 134 and/or controlling a PFCD 119, 260. Detailed descriptions of some examples of such power meter modules are provided in U.S. patent application Ser. No. 11/341,646, filed on Jan. 30, 2006 entitled, "Power Line Communications Module and Method," which is hereby incorporated herein by reference in it entirety.

A power line modem 136 couples a communication onto or off of an LV power line 114. A power line modem 136 is coupled on one side to the LV power line. On the other side, the power line modem 136 includes a connector to connect to a wired or wireless medium leading to the user device 130. One protocol for communicating with access nodes 132 over an LV power line is the HomePlug 1.0 standard of the HomePlug® Alliance for routing communications over low voltage power lines. In this manner, a customer can connect a variety of user devices 130 to the communication network 104.

The parameter sensor devices 115, power factor correction devices 119, 260, and applications for using the related data also may be incorporated in power line communication systems that communicate over underground power lines. Detailed descriptions of the components, features, and power line communication devices of some example underground PLCSs are provided in U.S. patent application Ser. No. 11/399,529 filed on Apr. 7, 2006 entitled, "Power Line Communications Device and Method," which is hereby incorporated herein by reference in its entirety. The parameter sensor devices 115 described herein (or portions thereof) may be formed in or integrated with couplers for coupling communication signals to and from the power lines. For example, the Rogowski coils described above may be attached to the transformer side of the coupler (or integrated into the coupler) that couples to the underground (or overhead) MV power lines to allow installation of the coupler to also accomplish installation of the sensing device 115.

Network Communication Protocols:

The communication network 104 may provide high speed internet access and other high data-rate data services to user devices, homes, buildings and other structure, and to each room, office, apartment, or other unit or sub-unit of multi-unit structure. In doing so, a communication link is formed between two communication nodes 128 over a communication medium. Some links are formed by using a portion 101 of the power system infrastructure. Specifically, some links are formed over MV power lines 110, and other links are formed over LV power lines 114. Still other links may be formed over another communication media, (e.g., a coaxial cable, a T-1 line, a fiber optic cable, wirelessly (e.g., IEEE 802.11a/b/g, 802.16, 1G, 2G, 3G, or satellite such as WildBlue®, other mobile telephone links (such as those identified above) or two way pager links)). Some links may comprise wired Ethernet, multipoint microwave distribution system (MMDS) standards, DOCSIS (Data Over Cable System Interface Specification) signal standards or another suitable communication method. The wireless links may also use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 GHz, 24 GHz, 38 GHz, or 60 GHz (i.e., 57-64 GHz)). Further, in some embodiments the PFDC 119, 260 may simply use a uni-directional or alternately a bi-directional communication link, which may include any of the communications described herein or others, which may be formed by a communication module integrated into the PFDC 119, 260 or a separate device.

Accordingly, the communication network 104 includes links that may be formed by power lines, non-power line wired media, and wireless media. The links may occur at any point along a communication path between a backhaul node 132 and a user device 130, or between a backhaul node 132 and a distribution point 127 or aggregation point 124. Other embodiments may simply comprise a communication network that does not include any power line links.

Communication among nodes 128 may occur using a variety of protocols and media. In one example, the nodes 128 may use time division multiplexing and implement one or more layers of the 7 layer open systems interconnection (OSI) model. For example, at the layer 3 'network' level, the devices and software may implement switching and routing technologies, and create logical paths, known as virtual circuits, for transmitting data from node to node. Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication nodes may vary. For example, the nodes coupled to power lines may include a modem that is substantially compatible with the HomePlug 1.0 or ANV standard. In various embodiments, the communications among nodes may be time division multiple access or frequency division multiple access.

Software

The communication network 104 may be monitored and controlled via a power line server that may be remote from the structure and physical location of the network elements. The controller of the nodes 128 describe herein may include executable program code for controlling the operation of the nodes and responding to commands. The PLS may transmit any number of commands to a backhaul nodes 132 and access nodes 134 to manage the system. As will be evident to those skilled in the art, most of these commands are equally applicable for backhaul nodes 132 and access nodes 134. For ease of discussion, the description of the commands will be in the context of a node 128 (meant to include both). These commands may include altering configuration information, synchronizing the time of the node 128 with that of the PLS, controlling measurement intervals (e.g., voltage measurements), requesting measurement or data statistics, requesting the status of user device activations, rate shaping, and requesting reset or other system-level commands. Any or all of these commands may require a unique response from the node 128, which may be transmitted by the node 128 and received and stored by the PLS. The PLS may include software to transmit a command to any or all of the nodes (134 and 132) to schedule a voltage and/or current measurement at any particular time so that all of the network elements of the PLCS take the measurement(s) at the same time.

Alerts

In addition to commands and responses, the node 128 has the ability to send Alerts and Alarms to the PLS. Alerts typically are either warnings or informational messages transmitted to the PLS in light of events detected or measured by the node 128. Alarms typically are error conditions detected.

One example of an Alarm is an Out-of-Limit Alarm that indicates that an out-of-limit condition has been detected at the node 128, which may indicate a power outage on the LV power line, an MV or LV voltage too high, an MV or LV voltage too low, a temperature measurement inside the node 128 is too high, and/or other out-of-limit conditions. Information of the Out-of-Limit condition, such as the type of condition (e.g., a LV voltage measurement, a node 128 temperature), the Out-of-Limit threshold exceeded, the time of detection, the amount (e.g., over, under, etc.) the out of limit threshold has been exceeded, is stored in the memory of the node 128 and transmitted with the alert or transmitted in response to a request from the PLS.

Software Upgrade Handler

The Software Upgrade Handler software may be started by the node 128 Command Processing software in response to a PLS command. Information needed to download the upgrade file, including for example the remote file name and PLS IP address, may be included in the parameters passed to the Software Command Handler within the PLS command.

Upon startup, the Software Command Handler task may open a file transfer program such as Trivial File Transfer Protocol (TFTP) to provide a connection to the PLS and request the file. The requested file may then be downloaded to the node 128. For example, the PLS may transmit the upgrade through the Internet to the node 128 (and perhaps through the backhaul node, and over the MV power line) where the upgrade may be stored in a local RAM buffer and validated (e.g., error checked) while the node 128 continues to operate (i.e., continues to communicate packets). Finally, the task copies the downloaded software into a backup boot page in non-volatile memory, and transmits an Alert indicating successful installation to the PLS. The node 128 then makes the downloaded software the primary boot page and reboots. When the device restarts the downloaded software will be copied to RAM and executed. The device will then notify the PLS that it has rebooted via an alert indicating such. In addition, and through substantially the same procedure, new software code may be received by the controller for storage in (e.g., to replace existing code) and execution at the media access control (MAC) layer of the LV modem and/or the MV modem of the access device or the backhaul device.

ADC Scheduler

Any of the nodes described herein may include an analog to digital converter (ADC) for measuring the voltage, current, and/or other parameters of any power line 110,114. The ADC may be located within the power line parameter sensor device 115 or within the power line communication device 138,139, 135. The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

ADC Measurement Software

The ADC Measurement Software, in conjunction with the real-time operating system, creates ADC measurement tasks that are responsible for monitoring and measuring data accessible through the ADC 330. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alert condition may be generated. Out of limit Alerts may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC, each of which has a corresponding ADC measurement task, may include node 128 inside temperature, LV power line voltage, LV power line current, MV power line voltage, and/or MV power line current for example. MV and LV power line measurements may be accomplished via the power line parameter sensor devices 115.

As discussed, the nodes may include value limits for most of these measurements stored in memory with which the measured value may be compared. If a measurement is below a lower limit, or above an upper limit (or otherwise out of an acceptable range), the node 128 may transmit an Out-of-Limit Alert. Such alert may be received and stored by the PLS. In some instances, one or more measured values are processed to convert the measured value(s) to a standard or more conventional data value.

The LV power line voltage measurement may be used to provide various information. For example, the measurement may be used to determine a power outage (and subsequently a restoration), or measure the power used by a consumer (when current data is also available) or by all of the consumers connected to that distribution transformer. In addition, it may be used to determine the power quality of the LV power line by measuring and processing the measured values over time to provide frequency, power factor, harmonic content, and other power line quality characteristics.

Traffic Monitoring Software

The Traffic Monitoring software may collect various data packet traffic statistics, which may be stored in memory including the amount of data (i.e., packets and/or bytes) communicated (i.e., transmitted and received) through the MV power line, through the switch, and/or through the LV power line; the amount of data (packets and/or bytes) communicated (transmitted and received) to or from the PLS; the number of Alerts and Alarms sent to the PLS; the number of DHCP messages to or from user devices; the number of failed user device authentications; the number of failed PLS authentications; and the number of packets and bytes received and/or transmitted from/to each user device (or PLM 50).

Rate Limiting

The nodes may include software for monitoring the bit rate of a particular device (e.g., PLM, computer, television, stereo, telephone, fax, gaming device, etc.) and also for rate limiting the communications of the device. Thus, if the bit rate (i.e., number of bits communicated over a given time period) reaches a particular threshold value for the device (which may be stored in memory of the node 128), the node 128 may slow or stop (postpone) communications for that device (e.g., until the beginning of the next time period, which may be one or more seconds, milliseconds, minutes, or microseconds). The threshold value may be received from the PLS during initial configuration, after configuration, upon request by the user, or after a modification of the user's subscription level.

For example, a user may transmit a request to rate limit a particular device to the PLS, which would allow a parent to rate limit the communications of a child's gaming device (e.g., Xbox™, or Playstation™), the child's downloading of music or video, Voice of Internet Protocol (VoIP), peer to peer communications (e.g., often used to transfer MP3 music files), or the communication of video or image files. In response, the PLS may transmit a rate limiting command and information to the node 128 to activate rate limiting of the device or process, which thereby initiates rate limiting in response to the PLS command. Thus, rate limiting may be effected for only select devices or processes of the subscriber, which may be requested by the user. As an example, a parent could turn off, turn on, or limit VoIP at certain times of the day or days of the week.

The rate limit information transmitted to the node 128 may include information of the device (e.g., address) and/or process (e.g., which may be indicated by the type of packets communicated such as video, gaming, voice, computer, MP3) that are to be rate limited for that subscriber or device. Thus, the node 128 may include information in memory sufficient to recognize certain types of processes (or packets), which is compared to communicated data to determine if rate limiting should be performed. Similarly, if rate limiting is based on address information (e.g., of the source and/or destination device), the node 128 may include rate limiting address information in memory, which is compared to address information of the communicated data to determine whether rate limiting should be performed. The rate limit information may also include a first threshold value for upstream and a second threshold value for downstream communications, which may or may not be the same.

In one embodiment the home administrator may "setup" all the home users (and their limits) and the information may be stored in memory at the node 128. When a home user logs in, their rule base will be attached to the virtual interface created by the login to perform the rate limiting. In a second embodiment, the home administrator may "setup" all the home users (and their limits) and the information may be stored in memory on a server at the POP. When a home user logs in, their rule base will be attached to the virtual interface created by the login to perform the rate limiting. In a third embodiment, the home administrator may "setup" all the home users (and their limits) and the information may be stored in memory on a server at the POP. When a home user logs in, their rule base will be attached to the virtual interface created by the login. The server will transmit a command and data to dynamically add or remove filter and rate limit rules to the node 128, which will store the data in memory and filter and/or rate limit according to the received information. Rate limiting may implementing via Extensible Authentication Protocol (EAP), Point-to-Point Protocol Over Ethernet (PP-PoE), or virtual private network (VPN).

The rate limiting software in the node 128 (or remote POP server) may analyze the data packets and may limit the communication of data packets through the node 128 based on data packets: 1) that are transmitted to the user device from a particular source (e.g., from a particular person, PLM, modem, user, domain name, email address, IP address and/or MAC source address); 2) that are transmitted from the user device to a particular destination (e.g., to a particular person, email address, user, domain name, modem, IP address and/or MAC destination address); 3) that have particular content (e.g., voice data, gaming data, image, audio, and/or video data); 4) based on the time of transmission or reception (e.g., times of the day and/or day(s) of the week); 5) that surpass a threshold quantity of data (either transmitted, received, or combination thereof) for a predetermined window of time (e.g., hour, minute, second, day, week, month, year, or subscription period); and/or 6) some combination thereof.

The rate limiting function may be used to rate limit or completely stop any or all such transmissions described above according any of such conditions. As an example of an application of rate limiting, the user may limit a particular device (e.g., a VoIP telephone) or data (VoIP data) to zero bits per second (bps) (i.e., prevent telephone calls) from 3 PM to 7 PM on Monday through Friday. Alternately, the user may limit gaming data to 1 Mbps from between 7 PM to 9 PM and allow the default rate (e.g., the rate provided to the user via the user's subscription which may also be controlled by the rate limiting function) during other times.

The nodes may also implement quality of service (QoS) for packets to and from certain devices, as a means to rate limit or in addition to rate limiting. For example, data of live voice communications (e.g., telephone voice communications) may be given higher priority than video data, which may be given higher priority than, gaming data, and computer data. Software on the user device may also add tags (bits) to the data packets to allow the node 128 to recognize the type of packet for implementing QoS, rate limiting, and data filtering. Thus, the nodes may receive the QoS information via the power line or other medium from the PLS for a particular subscriber, device, or process, and store the information in memory. Subsequently, the PLS may change the QoS setting in response to a user request or a change in the user's subscription—as instructed by the PLS. For example, when the user transmits a request to upgrade his or her subscription from data to voice (telephone) and data, the PLS may transmit new QoS information to the node 128 so that voice data of the user is given higher priority for transmission.

Data Filtering Software

The Data Filtering software provides filtering of data packets transmitted to and/or from a user device (or PLM 50). The filtering criteria may be supplied from the PLS (which may be based on requests received from the user) and is stored in memory of the node 128 and may form part of the routing table. The Data Filtering software may analyze the data packets and may prevent the transmission of data packets through the node 128: 1) that are transmitted to the user device from a particular source (e.g., from a particular person, user, domain name, email address, or IP or MAC source address); 2) that are transmitted from the user device to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof) for a predetermined window of time (e.g., a day, week, month, year, or subscription period); or 7) some combination thereof.

Examples of access devices 139, backhaul points 138, repeaters 158, power line servers, and other components are provided in U.S. patent application Ser. No. 11/091,677 filed Mar. 28, 2005, (Publ. No. 20050168326), entitled "Power Line Repeater System and Method," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety.

Additional Applications of Power Line Parameter Data:

Power line distribution parameter data may be gathered at regular times, periodically, aperiodically, at one or more scheduled times, or in response to specific commands or triggering events. Also, the power line distribution parameter data may be gathered from one sensor, multiple sensors or all sensors 116. For example, parameter data of a building, neighborhood, a city, a country, or other region may be collected. Alternately, data for the entire power line distribution system 104 may be collected. By gathering power line distribution parameter data, such as power line current, power line voltage, power factor data, load or other parameter, the efficiency of the power line distribution system may be improved. For example, real time monitoring of power line current at many locations (such as many MV power line locations) within the power line distribution system may enable switches in the system (MV feeder switches) to be reconfigured to redistribute the load (i.e., the flow of power) in response to measured data. The redistribution may be done manually (e.g., by sending personnel), semi-automatically (e.g., by personnel remotely actuating the switch(es)), and/or automatically (e.g., actuation of the switch(es) via a remote computer executing program code that transmits control information to actuate the switch). For example, when one area habitually uses less power, a portion of the available power may feeder load balancing may be adaptively optimized.

In addition, by monitoring fault current and thereby locating faults, the power outage may be reduced to consumer. By detecting a high impedance (low current) on a MV power line, a break in the overhead power line may be traced to a location, such as where current still flows, but at a reduced amount because the overhead power line is 'dancing' on the asphalt. By analyzing trends in power line current and short duration changes, transient faults may be located. By comparing the current output from a transformer with metered current at premises, detection of power theft may be identified and located. Current overloads may be identified to a specific device, signifying that such device should be replaced. Overloads also may be detected at a specific conductor, signifying that such conductor should be replaced. Overloads may be detected at a specific transformer, signifying that such transformer should be replaced. After a power outage, the measured current data may be used in selecting the MV power line switching sequences to restore power to specific areas. A switch may be evaluated by monitoring current across the switch (i.e., when in the normally closed position) to ensure that the switch is off and not faulty. A tie switch inadvertently left closed may be identified and located via current data. The measured current data may be used to derive power factor, which in turn may be used to determine if load in an area is too reactive (e.g. to inductive). When too the load is too reactive, a switch may be actuated to insert or take out a capacitor bank for such area. In addition, the devices may be configured or commanded to take substantially simultaneous measurements (to be transmitted to the PLS) to provide the power factor at a plurality of points on the power distribution network (e.g., at the output of many or all distribution transformers) to give the utility a snapshot of the network efficiency. By looking for a specific current signature pattern, such as a step function, an incipient failure of a transformer may be detected, and notice provided to the utility to replace the transformer. High voltage exceptions may be identified and located and low voltage exceptions may be identified and located.

Maintenance of the power line distribution system may be managed efficiently by monitoring power line distribution parameters at sensor devices 115 located at many power line communication devices 138, 139, 135 positioned throughout the communication and distribution system 104. Examples of maintenance that may be improved include recloser duty monitoring; reading voltages associated with specific capacitors, specific capacitor banks, and regulators; voltage imbalance detection may be performed; secondary neutral failures may be identified; and switching steps may be more effectively implemented during planned power outages.

Planning also may be managed more efficiently by monitoring power line distribution parameters at sensors 115/116 located at many power line communication devices 138, 139, 135 positioned throughout the communication and distribution system 104. Examples of planning processed that may be improved include; feeder flow planning (by power low validation); quantification of inrush current; quantification of cold load pickup; quantification of secondary losses; quantification of primary losses; application of manual switching devices; application of distribution automation devices; subsidiary relay settings; selection/validation of fuse sizes; recloser settings; capacitor switching sequencing; adaptive preferred/alternate switch schemes (semi-firm design); transformer unit/bank size requirements; and detection of current imbalances.

Figure 12:
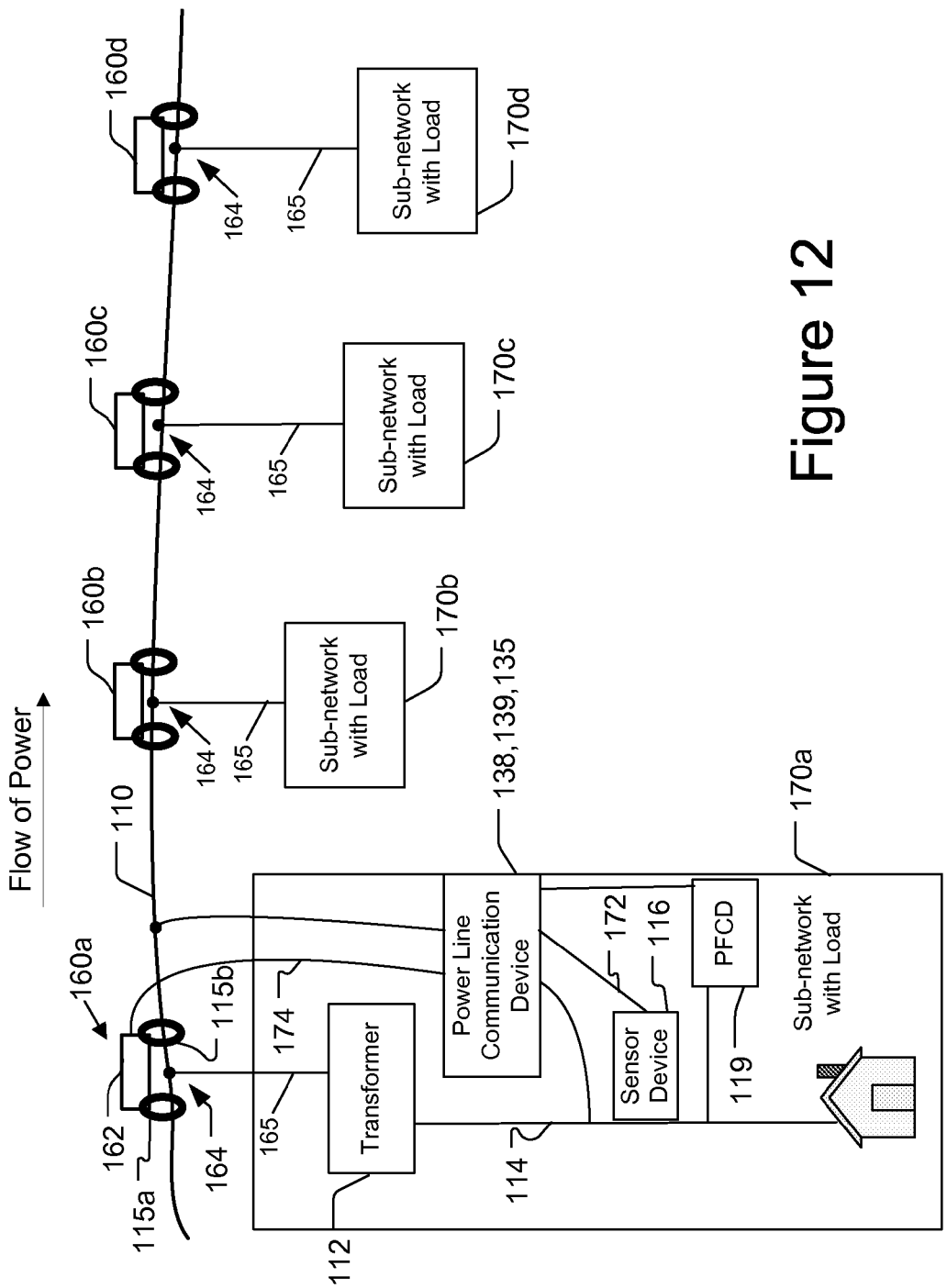
FIG. 12 illustrates a plurality of sensor devices located at various positions for collecting power line distribution parameter data according to an example embodiment of the present invention.

FIG. 12 shows an example embodiment of a portion of a network having multiple power line distribution parameter sensors, including dual sensor assemblies 160a-d and other sensor devices 115. The dual sensor device assemblies 160 may include a pair of current sensor devices 115 that may be coupled together (e.g., mechanically) and may share a common communication interface 162 for communication with a power line communication device (e.g., a backhaul device 138, an access device 139, or a repeater 135). In this example embodiment, the dual sensor device assembly 160 is coupled to the power line communication device 138, 139, 135 by a fiber optic conductor 174. In other embodiments of sensors 115, 116, 160, such as those shown in FIGS. 4 and 5, communications with the power line communication device may occur over a wireless communication path.

As shown in FIG. 12, the distribution transformer 112 is connected to the MV power line 110 via conductor 165 at a connection point referred to herein as "transformer tap" 164. In this example, a first current sensor device 115a is disposed on a first side of the transformer tap 164 and a second current sensor device 115b is disposed on the second side of the transformer tap 164. As shown in the figure, the flow of power is from left to right over the MV power line 110. Thus, current sensor device 115a measures the current on the MV power line 110 before the transformer tap 164 associated with transformer 112. Current sensor device 115b measures the current on the MV power line 110 after the transformer tap 164 associated with transformer 112. By computing the difference measured between the two measured current sensor devices 115 (the current of device 115a minus the current of 115b), the PLC device 138, 139, 135 (assembly device 160) or other device (e.g., a remote computer) can determine the current carried through conductor 165 and drawn by the transformer 112. Various sub-networks 170a-d may be coupled to the medium voltage power line 110 and also include the same sensor device assemblies 160 and power line communication devices.

A power line distribution parameter sensor device 116 that measures current and voltage of the LV power line also may be located between the transformer 112 and customer premises on a LV power line connected to the transformer 112. For example a power line distribution parameter sensor 116 may be located at the power meter for the premises, at the transformer 112 or somewhere along the low voltage power line 114. In the illustrated embodiment, the power line parameter sensor 116 is coupled to, and located near, the power line communication device 138, 139, 135 and includes a voltage and current sensing device measuring the voltage and current on both LV energized conductors (and current on the neutral).

By measuring current on the upstream and downstream side of the connection point 164, the current and/or power drawn by the transformer 112 can be determined by the power line communication device 138, 139, 135) and transmitted to a remote computer (e.g., over the MV power line, wirelessly, or via fiber optic) for use by the utility. Information of the current and/or power being drawn by the transformer 112 can be used initiate replacement of the transformer 112 (e.g., if the transformer load is approaching capacity) and/or for planning purposes. In addition, if the voltage of the MV power line 110 is known with sufficient accuracy or measured by a sensor device 116, the power input to, and output from, the transformer 112 can be calculated to thereby determine the efficiency of the transformer 112.

In some embodiments the dual sensor device assembly 160 may be packaged with (and installed together with) the conductor 165 at the connection point 164. For example, a conventional conductor 165 already in place may have its connector jumpered out to be replaced with a connector coupling to the dual sensor device assembly 160.

In some embodiments the dual sensor device assembly 160 may be self-powered, as discussed herein, by inductively drawing power from the medium voltage power line 110. Near the end of a medium voltage power line 110, the current may drop below a level needed to power the sensor assembly device 160d. In such case, however, the parameters measured by the immediately upstream dual sensor assembly 160c may be used to derive the load of the more downstream load 170d.

Figure 13:
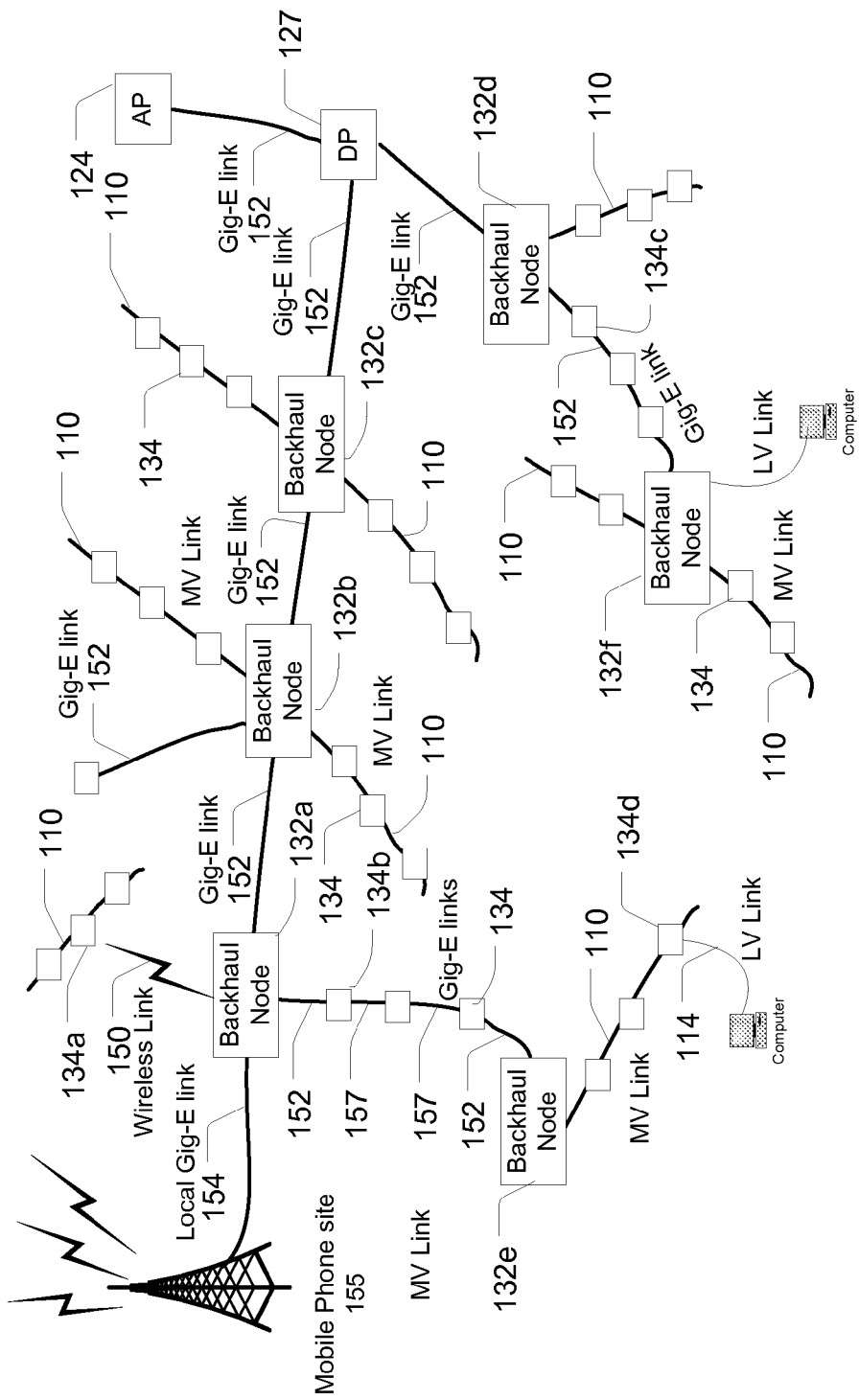
FIG. 13 is a partial network diagram showing an example topology of a power line communication and power distribution parameter system according to an example embodiment of the present invention.

Network Topology:

FIG. 13 shows an example embodiment of a network topology which illustrates many of the communication features of the backhaul node 132 and access node 134. For example, several backhaul nodes 132a-c may be coupled together in a daisy chain configuration by communication links 152. Such links 152 may be formed by the upstream and downstream ports of the gig-E switch 148 of the respective backhaul nodes 132. The gig-E switch 148 also may be implemented to connect a backhaul node 132c to a distribution point 127. Accordingly, the gig-E switch 148 may form part of a communication link along a path for communicating with an internet protocol network 126. Further, a local port of a gig-E switch 148 may be implemented to couple a backhaul node 132a to a mobile phone site 155 via link 154. The backhaul nodes 132a-d also may be coupled to MV power lines 110 to maintain MV links for communication with multiple access nodes 134 (shown as small rectangles). The backhaul node 132a may also be coupled to an access node 134a (which may repeat data for other access nodes 134) over a wireless communication link 150, for example, through the expansion port 146. The backhaul node 132a is further illustrated to couple to a chain of access devices 134 and a backhaul node 132e. The link from the backhaul node 132a to the access node 134b may be formed by coupling a downstream port of the gig-e switch 148 of backhaul node 132a to the gig-E port 156 of the access node 134b. A similar link is shown between the backhaul node 132d and the access node 134c. Still another communication link is shown over an LV power line 114 to couple an access node 134d to a computer and to couple a backhaul node 132f to computer via a LV power line 114.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A device for providing power factor correction of a power line carrying power having a voltage and a current, comprising:
  a power factor measurement module configured to measure the current and the voltage of the power line;
  a power factor correction assembly including a capacitance configured to be connected to the power line;
  wherein said power factor correction assembly is configured to vary the capacitance;
  a controller in communication with said power factor measurement assembly and said power factor correction assembly;
  a communication module in communication with said controller;
  wherein said controller is configured to cause said communication module to transmit data of the measured current and voltage to a remote computer system;
  wherein said controller is responsive to a command originating from the remote computer system to cause said power factor correction assembly to change the capacitance, substantially at a zero crossing of the voltage of the power carried by power line; and
  wherein said controller is configured to cause said power factor correction assembly to increase the capacitance upon determining that the voltage of the power line is below a predetermined voltage.

2. The device of claim 1,
  wherein said controller is configured to cause said communication module to transmit an alert to the remote computer system upon determining that the voltage of the power line is below the predetermined voltage.

3. The device of claim 1, wherein said controller is configured to cause said power factor correction assembly to change the capacitance based on information stored in a memory communicatively coupled to said controller.

4. The device of claim 1, further comprising a memory storing data that includes a power factor and an associated capacitance value.

5. The device of claim 4, wherein said controller is configured to cause said power factor correction assembly to change the capacitance to a capacitance value associated with a power factor stored in said memory.

6. The device of claim 1, wherein
  said controller is configured to receive interval data from the remote computer system,
  wherein the interval data comprises data of an interval for repeatedly obtaining data of the current and the voltage of the power line; and
  wherein said controller is configured to store the received interval data in a memory.

7. The device of claim 1, further comprising a filter in series with said capacitance and configured to attenuate power signal harmonics.

8. The device of claim 1, further comprising a filter in series with said capacitance and configured to attenuate power line communication signals.

9. The device of claim 1, wherein said controller is configured to determine a power factor from data of the measured current and voltage received from said power factor measurement module.

10. The device of claim 1, wherein said controller forms part of a communication device configured to provide communications to one or more user devices.

11. The device of claim 1, wherein said power factor correction assembly comprises a capacitor bank having a first terminal and a second terminal and wherein said first terminal is connected to a low voltage feeder line and said second terminal is connected to a non-energized power line conductor.

12. The device of claim 1, wherein said controller is configured to receive data from said power factor measurement module comprising measurement data obtained subsequent to a change in the capacitance by said power factor correction assembly and, based on the received data, to detect a failure of said power factor correction assembly.

13. The device of claim 1, wherein said remote computer system is configured to determine a power factor from data of the measured current and voltage received from said controller.

14. The device of claim 1, wherein said power factor correction assembly is configured to vary a first capacitance connected to a first energized conductor of a low voltage feeder and to vary a second capacitance connected to a second energized conductor of the low voltage feeder.

15. The device of claim 1, further comprising:
  a memory storing data that includes operational data comprising a plurality of power factors and a plurality of associated capacitance values;
  said memory in communication with said controller; and
  wherein said controller is configured to receive updated operational data via a transmission from the remote computer system and to store the updated operational data in said memory.

16. A system for providing power factor correction to a power distribution system that includes a plurality of power lines, the system comprising:
  a remote computer system;
  a plurality of correction assemblies, each comprising:
    a first capacitance configured to be connected to one of the plurality of power lines;
    a first switch configured to connect said first capacitance to the one power line and disconnect said first capacitance from the one power line;
    a first voltage sensor device configured to measure the voltage of the one power line;
    a first current sensor device configured to measure the current carried by the one power line;
    a communication module; and
    a first controller in communication with said first switch and said communication module and configured to receive current data from said first current sensor device and receive voltage data from said first voltage sensor device;
  wherein said first controller is configured to determine a power factor based on said current data and said voltage data;
  wherein said first controller is configured to cause said communication module to transmit the power factor to the remote computer system;
  wherein said remote computer system is configured to process received power factor data from a plurality of the correction assemblies;
  wherein said remote computer system is configured to transmit one or more control messages to one or more correction assemblies in response to processing data from one or more correction assemblies;
  wherein said first controller of each correction assembly is configured to respond to one or more control messages received from said remote computer system to operate said first switch to connect or disconnect said first capacitance, substantially at a zero crossing of the voltage of the one power line.

17. The system of claim 16, wherein each of the plurality of correction assemblies further comprises a first modem configured to communicate with a user device disposed in a customer premises supplied power by the low voltage subnet and wherein said first modem is in communication with said first controller.

18. The system of claim 16, wherein each of the plurality of correction assemblies further comprises a first modem configured to communicate over the medium voltage power line and in communication with said first controller.

19. The system of claim 16, wherein said first controller is configured to cause said communication module to transmit a notification to said remote computer system upon determining that the voltage of the one power line is below a threshold voltage.

20. The system of claim 16, wherein each of the plurality of correction assemblies further comprises a filter in series with said first capacitance and configured to attenuate power signal harmonics.

21. The system of claim 16, wherein each of the plurality of correction assemblies further comprises a filter in series with said first capacitance and configured to attenuate power line communication signals.

22. The system of claim 16, wherein said first controller is configured to
  operate said first switch to connect said first capacitance to the power line upon determining that the voltage of the one power line is below a threshold voltage.

23. The system of claim 16, wherein the one power line includes a low voltage feeder line that is connected to one or more low voltage power supply lines that supply power to one or more customer premises and wherein said first capacitance is configured to be connected to the low voltage feeder line.

24. The system of claim 16, wherein the one power line comprises a low voltage subnet that includes a low voltage feeder line that is connected to one or more low voltage power supply lines supplying power to one or more customer premises, the system further comprising:
  a second capacitance and wherein said first and second capacitance are each configured to be connected to a different low voltage power supply lines of the low voltage subnet.

25. The system of claim 24, wherein the current sensor device is configured to measure the current traversing the low voltage feeder line.

26. The system of claim 16,
  wherein said first controller is configured to receive data at least from said first voltage sensor both before and after a connection of said first capacitance to the power line and, based on the received data, to detect a failure of said correction assembly.

27. The system of claim 16, wherein each of the plurality of correction assemblies comprises a fuse in series with said first capacitance.

28. The system of claim 16, wherein each of the plurality of correction assemblies comprises:
- a memory storing data that includes operational data comprising a plurality of power factors and a plurality of associated capacitance values;
- said memory in communication with said first controller; and
- wherein said first controller is configured to receive updated operational data via a transmission from the remote computer system and to store the updated operational data in said memory.

* * * * *